(12) United States Patent
Yamaguchi et al.

(10) Patent No.: US 11,992,857 B2
(45) Date of Patent: May 28, 2024

(54) DROSS REMOVAL DEVICE, DROSS REMOVAL METHOD, DROSS DETECTION DEVICE, AND DROSS DETECTION METHOD

(71) Applicant: NIPPON STEEL CORPORATION, Tokyo (JP)

(72) Inventors: Makoto Yamaguchi, Tokyo (JP); Takeshi Harada, Tokyo (JP); Yusuke Tosa, Tokyo (JP); Tadashi Inaya, Tokyo (JP); Yuichi Tateishi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 877 days.

(21) Appl. No.: 16/977,774

(22) PCT Filed: Mar. 7, 2019

(86) PCT No.: PCT/JP2019/009188
§ 371 (c)(1),
(2) Date: Sep. 2, 2020

(87) PCT Pub. No.: WO2019/172393
PCT Pub. Date: Sep. 12, 2019

(65) Prior Publication Data
US 2020/0407832 A1 Dec. 31, 2020

(30) Foreign Application Priority Data
Mar. 7, 2018 (JP) .................................. 2018-040708

(51) Int. Cl.
*C23C 2/00* (2006.01)
*B05C 3/12* (2006.01)
(Continued)

(52) U.S. Cl.
CPC .............. *B05C 11/11* (2013.01); *B05C 3/125* (2013.01); *B22D 11/182* (2013.01);
(Continued)

(58) Field of Classification Search
CPC ........... C23C 2/003; C23C 2/522; C23C 2/52; C23C 2/325; C23C 2/00344;
(Continued)

(56) References Cited

U.S. PATENT DOCUMENTS

| | | | | |
|---|---|---|---|---|
| 6,129,888 A | * | 10/2000 | Goldstein | ............. C21C 5/4673 266/99 |
| 6,562,285 B1 | * | 5/2003 | Demysh | .................. F27D 21/04 266/44 |

(Continued)

FOREIGN PATENT DOCUMENTS

| | | |
|---|---|---|
| JP | 5-302157 A | 11/1993 |
| JP | 9-143653 A | 6/1997 |

(Continued)

*Primary Examiner* — Scott R Kastler
*Assistant Examiner* — Michael Aboagye
(74) *Attorney, Agent, or Firm* — Birch, Stewart, Kolasch & Birch, LLP

(57) ABSTRACT

A dross removal device including: a dross robot that is configured to collect a bath surface dross present on a bath surface of a coating bath; a dross sensor that is configured to measure an intensity of infrared light from the bath surface of the coating bath; a dross sensor control device that is configured to specify a position of the bath surface dross according to a temporal change amount in the intensity of the infrared light; and a dross robot control device that is configured to cause the dross robot to collect the bath surface dross at the position specified by the dross sensor control device.

9 Claims, 11 Drawing Sheets

(51) Int. Cl.
    *B05C 11/11*     (2006.01)
    *B22D 11/18*     (2006.01)
    *B22D 2/00*     (2006.01)
    *B22D 43/00*     (2006.01)

(52) U.S. Cl.
    CPC ........ *C23C 2/0034* (2022.08); *C23C 2/00344* (2022.08); *C23C 2/325* (2022.08); *C23C 2/52* (2022.08); *C23C 2/522* (2022.08); *B22D 2/001* (2013.01); *B22D 2/006* (2013.01); *B22D 43/005* (2013.01)

(58) Field of Classification Search
    CPC ....... C23C 2/0034; B05C 11/11; B05C 3/125; B22D 11/182; B22D 2/001; B22D 2/006; B22D 43/005; F27D 3/1554; C21B 7/14
    USPC .................................. 266/228, 44, 205, 227
    See application file for complete search history.

(56) References Cited

U.S. PATENT DOCUMENTS

| | | | |
|---|---|---|---|
| 8,475,594 B2 * | 7/2013 | Bright | C23C 2/00342 427/337 |
| 9,719,162 B2 * | 8/2017 | Anderhuber | C23C 2/40 |

FOREIGN PATENT DOCUMENTS

| | | | | |
|---|---|---|---|---|
| JP | 2001-64760 A | 3/2001 | | |
| JP | 2008-156696 A | 7/2008 | | |
| KR | 100732232 | * 6/2007 | ............... | C23C 2/06 |
| KR | 10-2011-0130859 A | 12/2011 | | |

\* cited by examiner

DROSS REMOVAL DEVICE, DROSS REMOVAL METHOD, DROSS DETECTION DEVICE, AND DROSS DETECTION METHOD

TECHNICAL FIELD OF THE INVENTION

The present invention relates to a dross removal device, a dross removal method, a dross detection device, and a dross detection method.

RELATED ART

As a coating method of continuously coating a metal strip such as a steel strip, a method of immersing a metal strip in a coating bath is known. In this method, the metal strip is immersed in the coating bath. The coating bath stores metal forming a coating layer in a molten state. Then, the metal strip is pulled up from the coating bath. At this time, the molten metal in the coating bath adheres to the metal strip and is pulled up together with the metal strip. That is, the metal strip is coated with the molten metal. Next, the thickness of the coating layer is adjusted by performing gas wiping on the metal strip coated with the molten metal. Thereafter, the coating layer is cooled. Through the above steps, the metal strip is continuously coated.

In such a coating method, there are cases where the molten metal in the coating bath is alloyed with the metal eluted from the metal strip into the coating bath to form dross. Then, a portion of the dross floats on the bath surface of the coating bath as top dross. For example, in a case where hot-dip galvanizing is performed on a steel strip, molten zinc and molten aluminum in the coating bath are alloyed with iron eluted from the steel strip into the coating bath. For example, molten zinc, molten aluminum, and iron cause an alloying reaction represented by Reaction Formulas (1) and (2). Then, $Fe_2Al_5$ floats on the coating bath surface as top dross.

$$Fe + 7Zn \rightarrow FeZn_7 \quad (1)$$

$$2FeZn_7 + 5Al \rightarrow Fe_2Al_5 + 14Zn \quad (2)$$

Furthermore, the molten metal scattered from the coating layer by gas wiping is oxidized by oxygen in the air and becomes oxide particles. Such oxide particles fall on the coating bath surface as dross. Hereinafter, such dross is also referred to as "scattered dross". For example, in a case where hot-dip galvanizing is performed on a steel strip, zinc scattered from a coating layer is oxidized by oxygen in the air as shown in Reaction Formula (3).

$$2Zn + O_2 \rightarrow 2ZnO \quad (3)$$

Furthermore, the exposed surface of the coating bath is also oxidized by oxygen in the air and forms an oxide film. Although such an oxide film is very thin at the beginning of formation, the oxide film grows over time and becomes dross. Hereinafter, such dross is also referred to as oxide film dross. As described above, the top dross, the scattered dross, and the oxide film dross coexist on the bath surface of the coating bath. Hereinafter, these drosses are collectively referred to as "bath surface dross".

Prior Art Document

Patent Document

[Patent Document 1] Japanese Unexamined Patent Application, First Publication No. H5-302157

[Patent Document 2] Japanese Unexamined Patent Application, First Publication No. 2001-64760

[Patent Document 3] Japanese Unexamined Patent Application, First Publication No. 2008-156696

[Patent Document 4] Japanese Unexamined Patent Application, First Publication No. H9-143653

DISCLOSURE OF THE INVENTION

Problems to be Solved by the Invention

When the bath surface dross that has been aggregated and grown adheres to the surface of a steel sheet, the external appearance is impaired, and the bath surface dross is pressed into the steel sheet during press forming such that the pattern is transferred onto the opposite surface and causes a poor external appearance. As described above, since the bath surface dross causes surface defects, the steel sheet to which the dross adheres cannot be used in applications where external appearance is important. In particular, in recent years, for efficient coating of a metal strip, there is a strong demand for an increase in the sheet threading speed of the metal strip. When the sheet threading speed is increased, the amount of bath surface dross generated is increased accordingly. For example, in a case where the sheet threading speed is increased, a larger amount of molten metal adheres to the metal strip when the metal strip is pulled up from the coating bath. Therefore, a larger amount of molten metal needs to be subjected to gas wiping. Therefore, the scattered dross increases in amount. Therefore, a technique for efficiently collecting bath surface dross from the coating bath has been strongly desired.

As a method of collecting bath surface dross, there is a manual collecting method. In this method, an operator collects bath surface dross from a coating bath using a pumping jig. The amount of bath surface dross that can be collected by a single pumping operation is much smaller than the total amount of bath surface dross present on the surface of the coating bath, and the collecting operation is a heavy labor. Therefore, it is necessary to repeat the pumping operation, which is a heavy labor, many times, and the collection efficiency is very poor.

In order to solve such a problem, Patent Documents 1 to 4 propose techniques for automatically collecting bath surface dross using a dross robot. However, these techniques can only cause the dross robot to perform a predetermined movement regardless of the presence or absence or the position of the bath surface dross. For this reason, for example, there is waste such as pumping up the coating bath in a region where there is no bath surface dross. Therefore, the collection efficiency that exceeds the human power described above cannot be realized. For these reasons, the dross robot has been used only to a limited extent.

Therefore, the present invention has been made in view of the above problems, and an object of the present invention is to provide a novel and improved dross removal device capable of more efficiently collecting a bath surface dross using a dross robot, a dross removal method, a dross detection device, and a dross detection method.

Means for Solving the Problem

In order to solve the above-mentioned problems, according to an aspect of the present invention, there is provided a dross removal device including: a dross robot that is configured to collect a bath surface dross present on a bath surface of a coating bath; a dross sensor that is configured to measure an intensity of infrared light from the bath surface of the coating bath; a dross sensor control device that is configured to specify a position of the bath surface dross according to a temporal change amount in the intensity of the infrared light; and a dross robot control device that is configured to cause the dross robot to collect the bath surface dross at the position specified by the dross sensor control device.

Here, the dross sensor may measure a temperature of the bath surface of the coating bath according to the intensity of the infrared light, and the dross sensor control device may specify the position of the bath surface dross according to a temporal temperature change amount in the bath surface of the coating bath.

In addition, the dross sensor may divide the bath surface into a plurality of small regions, and measure a temperature of each of the small regions, and the dross sensor control device may determine whether or not the bath surface dross is present in the small region according to the temporal temperature change amount in each of the small regions.

In addition, the dross sensor control device may determine that the bath surface dross is present in the small region in a case where the temporal temperature change amount is equal to or less than a predetermined value.

In addition, the dross sensor control device may determine that the bath surface dross is present in the small region in a case where a maximum value of the temporal temperature change amount is equal to or less than a predetermined value.

In addition, the dross sensor control device may determine that the bath surface dross is present in the small region in a case where the temporal temperature change amount is equal to or less than a first predetermined value, and determine that a half dross is present in the small region in a case where the temporal temperature change amount is larger than the first predetermined value and is equal to or less than a second predetermined value, and the dross robot control device may cause the dross robot to collect the bath surface dross in preference to the half dross.

In addition, the dross robot control device may cause the dross robot to collect the half dross after the dross sensor control device determines that the bath surface dross is not present within a detection range of the dross sensor.

In addition, the dross sensor may be a radiation-type thermometer, detect the intensity of the infrared light from the bath surface, and measure a temperature of the bath surface according to the intensity of the infrared light.

According to another aspect of the present invention, there is provided a dross removal method including: an infrared light intensity measuring step of measuring an intensity of infrared light from a bath surface of a coating bath; a dross position specifying step of specifying a position of a bath surface dross according to a temporal change amount in the intensity of the infrared light; and a dross collecting step of causing a dross robot to collect the bath surface dross at the position specified by the dross position specifying step.

According to another aspect of the present invention, there is provided a dross detection device including: a dross sensor that is configured to measure an intensity of infrared light from a bath surface of a coating bath; and a dross sensor control device that is configured to specify a position of a bath surface dross according to a temporal change amount in the intensity of the infrared light.

According to another aspect of the present invention, there is provided a dross detection method including: an infrared light intensity measuring step of measuring an intensity of infrared light from a bath surface of a coating bath; and a dross position specifying step of specifying a position of a bath surface dross according to a temporal change amount in the intensity of the infrared light.

Effects of the Invention

As described above, according to the present invention, the dross removal device specifies the position of the bath surface dross according to the temporal change amount in the intensity of infrared light, and causes the dross robot to collect the bath surface dross at the specified position. Therefore, since the bath surface dross can be preferentially collected, the bath surface dross can be efficiently collected.

EMBODIMENTS OF THE INVENTION

Figure 1:
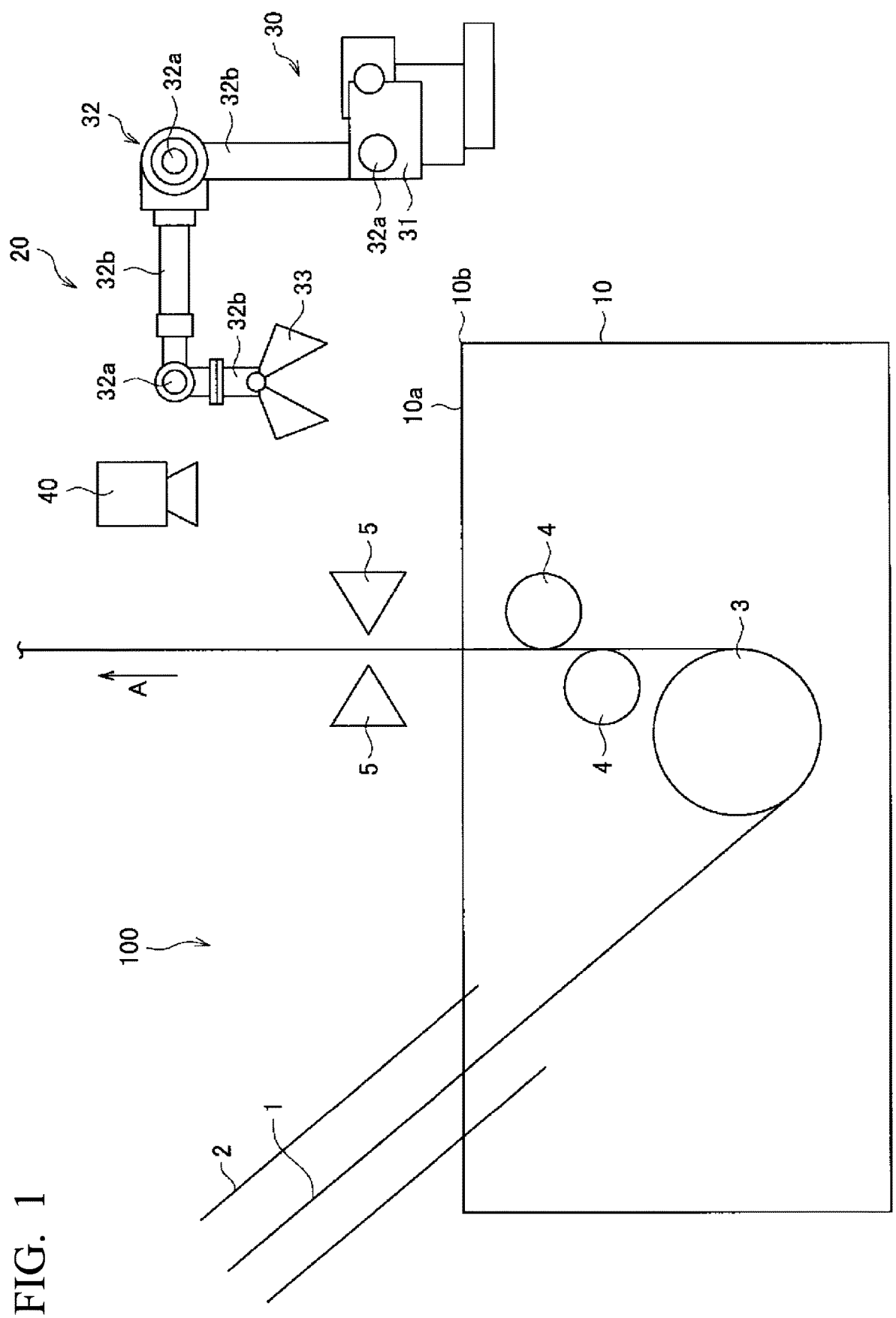
FIG. 1 is an explanatory diagram showing an overall configuration of a coating apparatus according to a first embodiment of the present invention.

Hereinafter, preferred embodiments of the present invention will be described in detail with reference to the accompanying drawings. In the present specification and the drawings, constituent elements having substantially the same functional configuration are denoted by the same reference symbols, and overlapping description will be omitted. In addition, in the drawings, in order to facilitate understanding of each constituent element, each constituent element is shown in an appropriately enlarged or reduced scale. That is, the size of each constituent element shown in the drawings does not necessarily match the actual size (particularly, the size relationship between the constituent elements).

1. First Embodiment

1-1. Overall Configuration of Coating Apparatus

Figure 2:
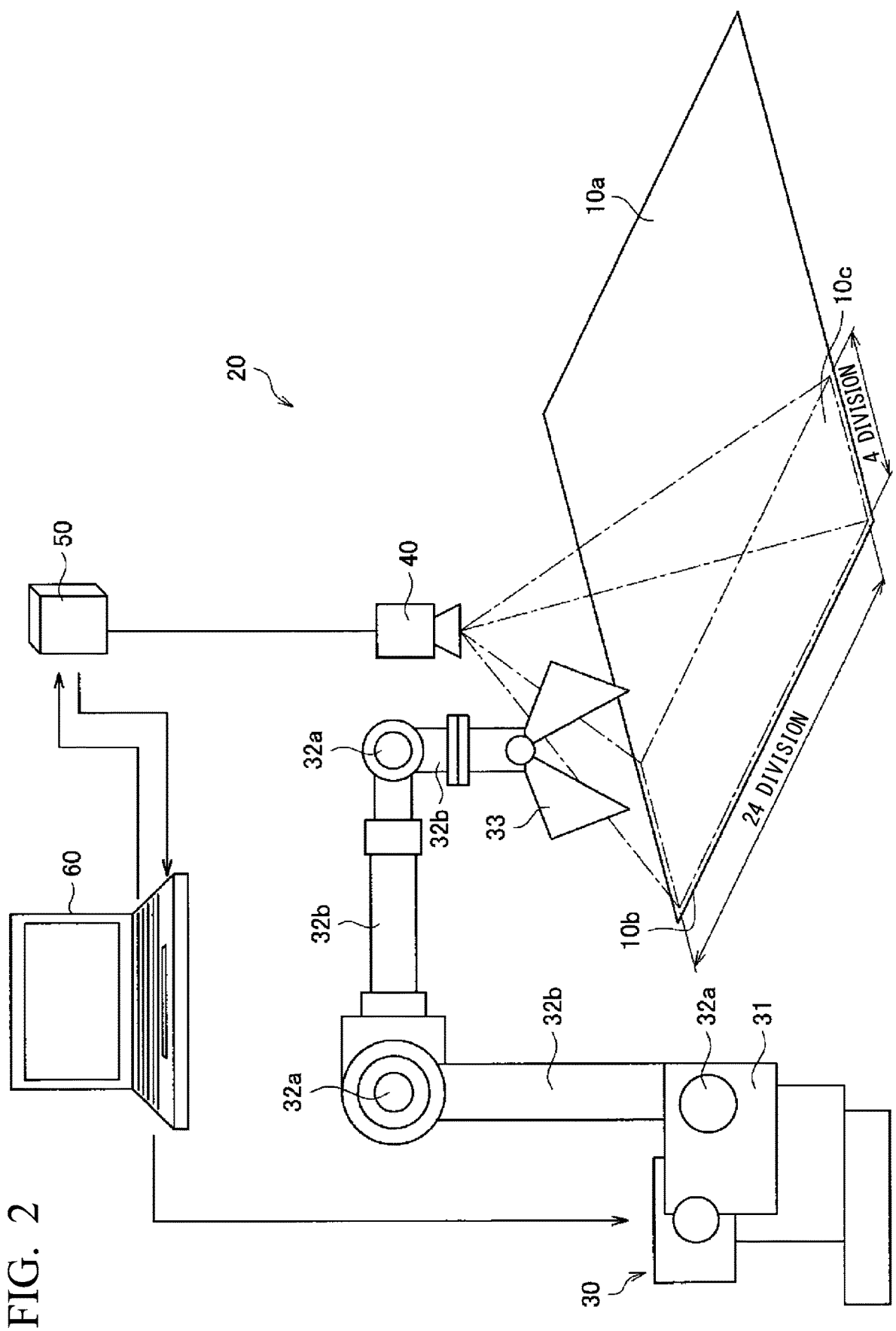
FIG. 2 is an explanatory diagram showing the overall configuration of the dross removal device according to the embodiment.
Figure 3:
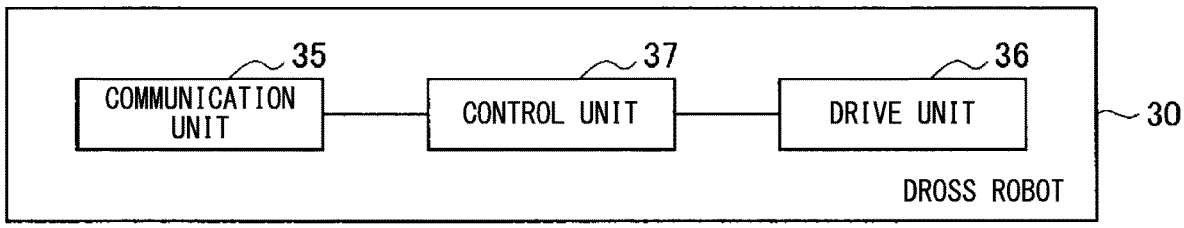
FIG. 3 is a functional block diagram showing an internal configuration of a dross robot.

First, the overall configuration of a coating apparatus 100 according to the present embodiment will be described according to FIGS. 1 and 2. The coating apparatus 100 includes a coating bath 10, a snout 2, a pot roll (sink roll) 3, a pair of support rolls 4, a gas wiping device 5, and a dross removal device 20.

The coating bath 10 is a bath (liquid pool) that stores molten metal to coat a metal strip 1. The metal strip 1 is continuously immersed in the coating bath 10. The metal strip 1 is threaded in the direction of arrow A.

For example, in a case of producing a hot-dip galvanized steel sheet, the metal strip 1 is a steel strip. The coating bath 10 contains molten metal primarily containing Zn and Al. For example, the coating bath 10 may contain about 0.10 to 0.13 mass % of Al with respect to the total mass of the coating bath 10. In addition, the coating bath 10 contains iron eluted from the metal strip 1. The remainder of the coating bath 10 is Zn. As a matter of course, the present embodiment can be applied to other kinds of coating baths. For example, the present embodiment may be applied to an aluminum-based, tin-based, or lead-based coating bath. That is, the present embodiment can be applied to various coating baths in which dross can occur.

The snout 2 is a tubular member, and a portion thereof is inserted into the coating bath 10. The metal strip 1 is guided by the snout 2 (that is, through the hollow portion of the snout 2) and immersed in the coating bath 10.

The pot roll 3 is provided in the coating bath 10 and guides the metal strip 1 in the coating bath 10 vertically upward, that is, to a bath surface 10a of the coating bath 10. The pair of support rolls 4 is provided between the pot roll 3 and the bath surface 10a of the coating bath 10 and holds the metal strip 1 that has passed through the pot roll 3. For example, the pair of support rolls 4 is composed of two support rolls, and one support roll and the other support roll sandwich the metal strip 1 therebetween. As described above, the pair of support rolls 4 corrects the shape of the metal strip 1 into a flat sheet shape while suppressing the vibration of the metal strip 1 by contacting both the front and rear surfaces of the metal strip 1. The pair of support rolls 4 guides the metal strip 1 to the bath surface 10a.

The metal strip 1 that has passed through the pair of support rolls 4 is pulled up from the coating bath 10. At this time, the molten metal in the coating bath 10 adheres to the metal strip 1 and is pulled up together with the metal strip 1. That is, the metal strip 1 is coated with the molten metal. The metal strip 1 coated with the molten metal is continuously threaded upward. The gas wiping device 5 adjusts the thickness of the coating layer by performing gas wiping on the metal strip 1 coated with the molten metal. Through the above steps, the metal strip 1 is continuously coated.

As described above, there are cases where the molten metal in the coating bath 10 is alloyed with the metal eluted from the metal strip 1 into the coating bath 10 to form dross. Then, a portion of the dross floats on the bath surface 10a as top dross. For example, in a case where hot-dip galvanizing is performed on a steel strip, molten zinc and molten aluminum in the coating bath are alloyed with iron eluted from the steel strip into the coating bath. For example, molten zinc, molten aluminum, and iron cause the alloying reaction represented by Reaction Formulas (1) and (2) described above. Then, $Fe_2Al_5$ floats on the bath surface 10a as top dross.

Furthermore, the molten metal scattered from the coating layer by gas wiping is oxidized by oxygen in the air and becomes oxide particles. Such oxide particles fall on the bath surface 10a as scattered dross. For example, in a case where hot-dip galvanizing is performed on a steel strip, zinc scattered from a coating layer is oxidized by oxygen in the air as shown in Reaction Formula (3) described above.

Furthermore, the bath surface 10a of the coating bath 10 is also oxidized by oxygen in the air and forms an oxide film. Although such an oxide film is very thin at the beginning of formation, the oxide film grows over time and becomes oxide film dross. As described above, the top dross, the scattered dross, and the oxide film dross coexist on the bath surface of the coating bath. Hereinafter, these drosses are collectively referred to as "bath surface dross".

As described above, the bath surface dross causes surface defects. Therefore, it is necessary to collect the bath surface dross from the coating bath 10 as efficiently as possible. The dross removal device 20 according to the present embodiment can efficiently collect such bath surface dross from the coating bath 10.

Figure 14:
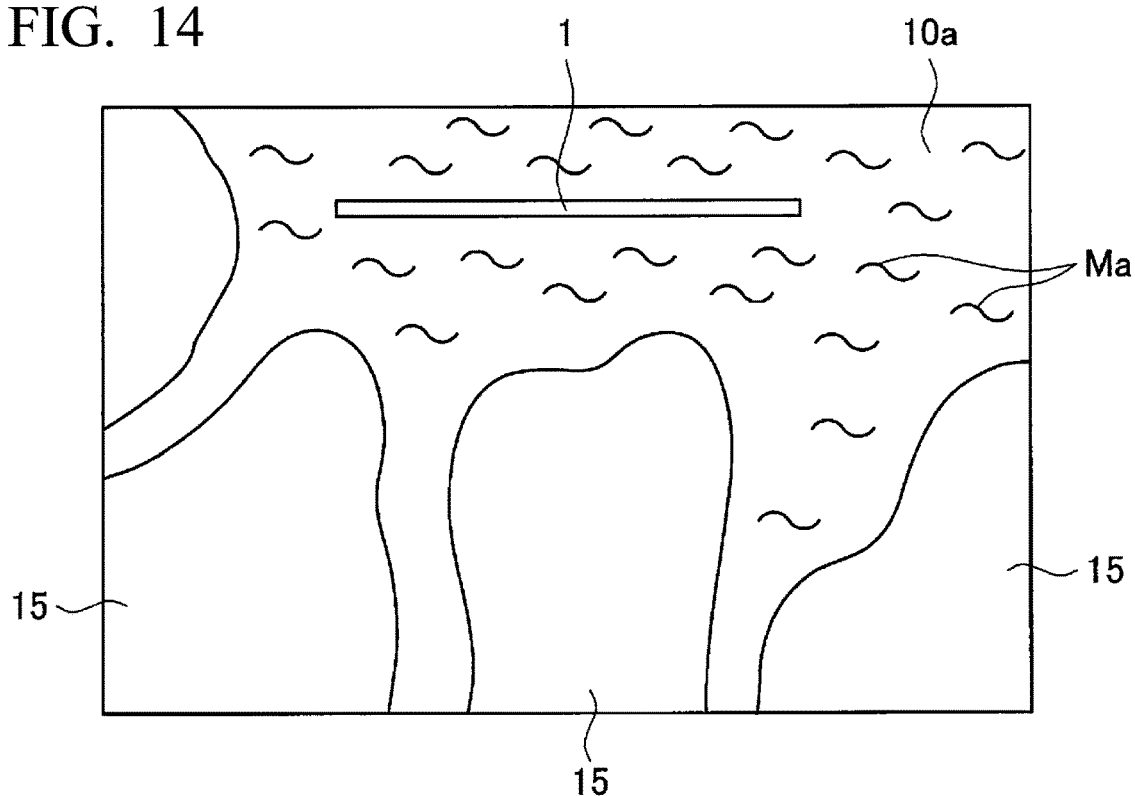
FIG. 14 is a plan view for describing the condition of a bath surface of a coating bath.

Here, an outline of the condition of the bath surface 10a is shown in FIG. 14. FIG. 14 is merely a conceptual diagram. Bath surface dross 15 floats on the bath surface 10a. In addition, since the metal strip 1 is continuously immersed in the coating bath 10, a wave Ma is generated on the bath surface 10a. However, the generation of the wave Ma is suppressed in a region where the bath surface dross 15 is present. As described above, the state of waviness of the bath surface 10a is different between the region where the bath surface dross 15 is present and a region where the bath surface dross 15 is not present. In the present embodiment, the bath surface dross 15 is detected according to such a difference in the state of waviness.

In addition, in the present embodiment, the term dross is not limited to the meaning of the commonly used term, and is used to mean suspended matter that contains components different from the components forming the molten metal or components that are the same as those forming the molten metal but have a different composition, and suppresses the waviness of the surface of the molten metal by floating on the bath surface. Furthermore, the dross to be detected in the present embodiment can include, as well as those floating on the bath surface 10a, those sinking slightly downward from the bath surface 10a. Such dross may also suppress the waviness of the bath surface 10a, and thus can be a target of detection according to the present embodiment.

1-2. Configuration of Dross Removal Device

Next, the configuration of the dross removal device 20 will be described in detail with reference to FIGS. 1 to 9B. As shown in FIGS. 1 and 2, the dross removal device 20 includes a dross robot 30, a dross sensor 40, a dross sensor control device 50, and a dross robot control device 60. Dross is detected by the dross sensor 40 and the dross sensor control device 50. That is, these configurations constitute a dross detection device. In addition, the dross sensor 40 and the dross sensor control device 50 may be integrated with each other. For example, the function of the dross sensor 40 may be incorporated in the dross sensor control device 50.

The dross robot 30 is driven according to a control signal from the dross robot control device 60 to collect the bath surface dross. For example, the dross robot 30 is provided outside one end portion 10*b* of the coating bath 10 and includes a main body portion 31, an arm portion 32, and a collecting portion 33. Moreover, the dross robot 30 includes, as an internal configuration, a communication unit 35, a drive unit 36, and a control unit 37 shown in FIG. 3. The communication unit 35, the drive unit 36, and the control unit 37 are realized by any of hardware configurations such as a CPU, a ROM, a RAM, a communication device, and an actuator. A program necessary for the operation of the dross robot 30 is recorded on the ROM, and the CPU reads and executes the program.

The main body portion 31 is movable along the end portion 10*b*. One end portion of the arm portion 32 is connected to the main body portion 31, and the other end portion is connected to the collecting portion 33. The arm portion 32 includes a plurality of joint portions 32*a* and a connecting portion 32*b* that connects the joint portions 32*a*. Each joint portion 32*a* is rotatable within a predetermined angle range, and by rotating each joint portion 32*a*, the collecting portion 33 can be moved to a desired position, for example, a position where bath surface dross is present. The shapes of the main body portion 31 and the arm portion 32 are not limited to the example shown in FIG. 1. That is, the main body portion 31 and the arm portion 32 may have any shape as long as the effects of the present embodiment can be obtained. For example, the number of joint portions 32*a* forming the arm portion 32 is not limited to three shown in FIG. 1. The collecting portion 33 is a jig for collecting (that is, pumping up) the bath surface dross. The shape of the collecting portion 33 is not particularly limited, but examples thereof include a ladle type and a bucket type. The shape of the collecting portion 33 may be appropriately selected according to the characteristics of the dross and the like.

The communication unit 35 communicates with the dross robot control device 60. The form of communication (for example, as well as communication between the dross robot 30 and the dross robot control device 60, various kinds of communication described below) in the present embodiment is not particularly limited, and may be wired communication or wireless communication. Examples of the form of communication include wired LAN, wireless LAN, wired communication using a USB cable, and wireless communication using Bluetooth. The drive unit 36 drives the main body portion 31, the joint portion 32*a*, and the collecting portion 33. The control unit 37 controls each constituent element of the dross robot 30. For example, the dross robot 30 is driven by controlling an actuator. The drive unit 36 drives the arm portion 32 and the collecting portion 33 according to a control signal from the dross robot control device 60, and collects the bath surface dross at the position designated by the control signal.

The dross robot 30 removes the molten metal from the collected bath surface dross (for example, by filtration). Next, the dross robot 30 puts the bath surface dross into a dross recovery box. When the collecting portion 33 is immersed in the coating bath 10, the height of the bath surface 10*a* from the bottom surface of the coating bath fluctuates. The height of the bath surface 10*a* needs to be within a preset range. Therefore, the dross robot 30 immerses the collecting portion 33 in the coating bath 10 so that the bath surface 10*a* falls within a preset range.

Although the details will be described later, the dross robot 30 collects the dross present within a detection range 10*c* of the dross sensor 40. The detection range 10*c* is set near the end portion 10*b*. The end portion 10*b* of the coating bath 10 is on the opposite side of the end portion on which the snout 2 is installed, with the metal strip 1 interposed therebetween. The gas sprayed from the gas wiping device 5 onto the coating layer descends along the metal strip 1 and thereafter flows toward the end portion 10*b* on the bath surface 10*a*. Therefore, the bath surface dross is pushed by the gas and moves toward the end portion 10*b*. Therefore, the bath surface dross is likely to collect near the end portion 10*b*. Therefore, in the present embodiment, the dross robot 30 is disposed outside the end portion 10*b* to collect the bath surface dross collected near the end portion 10*b*.

The dross sensor 40 measures the intensity of infrared light from the bath surface 10*a* within the detection range 10*c*, and measures the temperature of the bath surface 10*a* within the detection range 10*c* according to the measured intensity of the infrared light. The dross sensor 40 is formed as, for example, a radiation-type thermometer or an infrared thermography camera. Hereinafter, an example of processing performed by the dross sensor 40 will be described. The dross sensor 40 divides the detection range 10*c* into a plurality of small regions. Here, each small region is a region that can be a target of dross recovery. Next, the dross sensor 40 measures the intensity of infrared light from each small region. Here, the infrared light to be measured may be infrared light radiated from the small region and incident on the dross sensor 40, or infrared light reflected by the small region and incident on the dross sensor 40. In addition, the dross sensor 40 measures the temperature of each small region according to the measured intensity of infrared light. For example, as shown in FIG. 2, the dross sensor 40 divides the detection range 10*c* into 96 small regions by dividing the short side of the detection range 10*c* into four and the long side into 24. In addition, the dross sensor 40 measures the temperature of each small region. Since there are cases where the temperature itself in the small region also has a distribution, for example, the dross sensor 40 may measure the temperature at the center point of the small region. The size of each small region is preferably set to be equal to or less than the area that can be pumped up by the collecting portion 33 at one time. Furthermore, each small region is preferably set at a position where the dross can be pumped up, and may be set at a position considering the operable range of the dross robot 30 other than the method of dividing the detection range 10*c* described above. The dross sensor 40 transmits temperature distribution information in which the position and the temperature of the small region are associated, to the dross sensor control device 50. The position of the small region may be in any form as long as the position is information that can specify the position of the small region of the dross robot, and examples thereof include coordinates of the small region and an identifier that specifies the small region. As the coordinates of the small region, for example, the coordinates of the temperature measurement position can be suitably used. The detection range 10*c* is not limited to the example shown in FIG. 2. For example, a wider region may be used as the detection range 10*c*. Furthermore, a plurality of dross removal devices 20 may be prepared, and the detection ranges 10*c* of the respective dross removal devices 20 may be separate ranges. Although an optical axis D (see FIG. 8B) of the dross sensor 40 is set to a vertical direction in FIG. 2, the optical axis of the dross sensor 40 may be shifted from the vertical direction as long as the dross sensor 40 can detect the intensity of infrared light.

Figure 4:
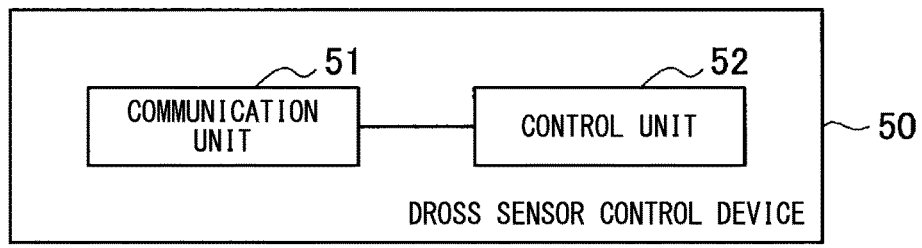
FIG. 4 is a functional block diagram showing an internal configuration of a dross sensor control device.

In addition to controlling the dross sensor 40, the dross sensor control device 50 determines the presence or absence of dross on the bath surface within the detection range 10*c* of the dross sensor 40 according to the temperature distribution information. Then, the dross sensor control device 50 transmits dross position information indicating the position of the bath surface dross, to the dross robot control device 60. For example, the dross sensor control device 50 includes a communication unit 51 and a control unit 52, as shown in FIG. 4. The communication unit 51 and the control unit 52 are realized by any of hardware configurations such as a CPU, a ROM, a RAM, and a communication device. A program necessary for the operation of the dross sensor control device 50 is recorded on the ROM, and the CPU reads and executes the program. The communication unit 51 receives the temperature distribution information transmitted from the dross sensor 40, outputs the temperature distribution information to the control unit 52, and communicates with the dross robot control device 60. The control unit 52 controls the dross sensor control device 50. Furthermore, the control unit 52 determines the presence or absence of dross on the bath surface within the detection range 10*c* of the dross sensor 40 according to the temperature distribution information. In addition, the control unit 52 outputs the dross position information indicating the position of the bath surface dross to the communication unit 51. The control unit 52 may also output to the communication unit 51 an instruction to collect the dross at the position where the dross is determined to be present. The communication unit 51 transmits the dross position information to the dross robot control device 60.

For example, the communication unit 51 receives temperature request information transmitted from the dross robot control device 60 and outputs the temperature request information to the control unit 52. Here, the temperature request information is, for example, information requesting the above-mentioned dross position information. The temperature measurement (infrared light intensity measurement) by the dross sensor 40 is preferably performed at a timing when the dross robot 30 does not hinder the measurement. For example, the temperature request information is transmitted from the dross robot control device 60 to the dross sensor control device 50 after the dross robot 30 removes the dross and returns to a start position. Alternatively, the dross sensor control device 50 may control the dross sensor 40 to start the temperature measurement after a predetermined time has elapsed since the temperature request information was received. The control unit 52 generates temperature measurement instruction information according to the temperature request information and outputs the temperature measurement instruction information to the communication unit 51. The communication unit 51 transmits the temperature measurement instruction information to the dross sensor 40. Here, the temperature measurement instruction information is, for example, information requesting the above-mentioned temperature distribution information. When the temperature measurement instruction information is given, the dross sensor 40 measures the temperature of each small region and outputs the temperature distribution information to the communication unit 51. For example, the dross sensor 40 measures the temperature of each small region at every predetermined measurement interval (tf) and generates temperature distribution information. Then, the dross sensor 40 transmits the temperature distribution information to the dross sensor control device 50. The measurement interval is not particularly limited, but may be about 0.02 msec, for example.

Figure 6:
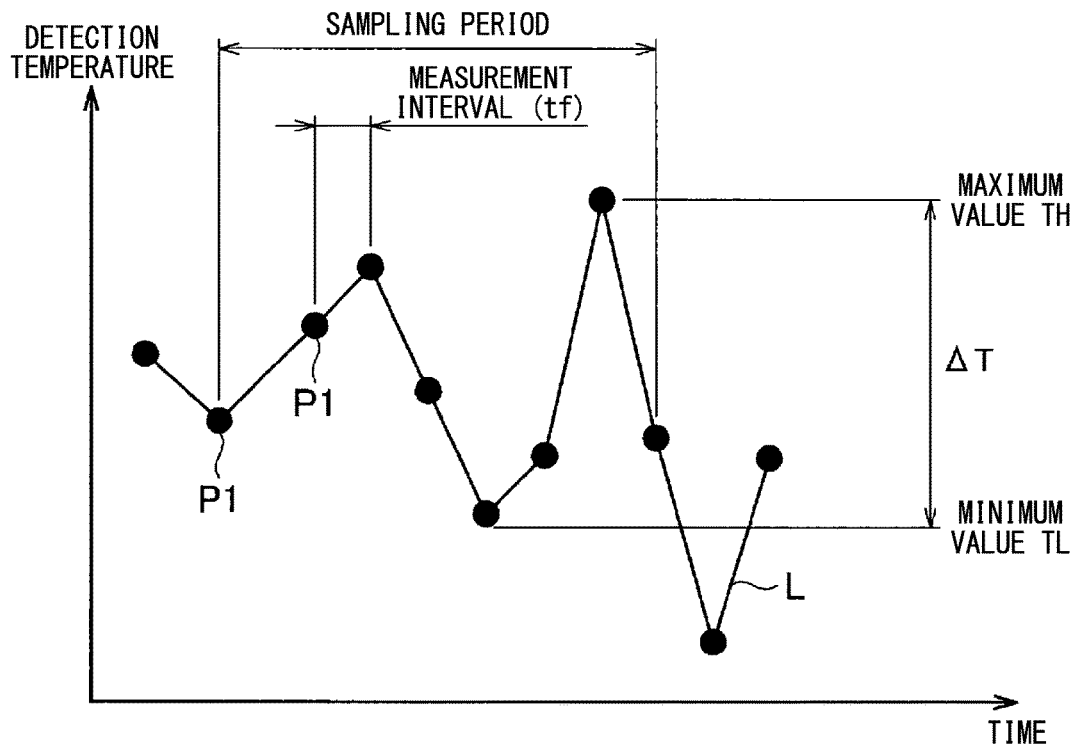
FIG. 6 is a graph showing an example of a temporal temperature change detected by a dross sensor.

The communication unit 51 of the dross sensor control device 50 receives the temperature distribution information and outputs the temperature distribution information to the control unit 52. The control unit 52 determines the presence or absence of dross on the bath surface for each small region within the detection range 10*c* of the dross sensor 40 according to the temperature distribution information. For example, the control unit 52 performs the following processing for each small region in the measurement range of the dross sensor 40. First, the temperature distribution information is given at each measurement interval. Therefore, the control unit 52 analyzes a temporal temperature change for each small region according to the temperature distribution information. Here, since the temperature distribution information also indicates the infrared light intensity profile, it can be said that the control unit 52 analyzes the temporal change amount in the intensity of infrared light. FIG. 6 shows an example of the temporal temperature change in a small region. The horizontal axis represents the time, and the vertical axis represents the temperature of the small region, that is, the detected temperature. A point P1 indicates a temperature obtained from each temperature distribution information. A graph L is a connection of the points P1 and shows a temporal temperature change. The control unit 52 specifies a maximum value TH and a minimum value TL of the temperatures detected within a preset sampling period. In addition, according to the difference therebetween, that is, a maximum value ΔT of the temporal temperature change amount, it is determined whether or not the bath surface dross is present in the small region. The sampling period is not particularly limited, but may be about 15 seconds as an example. In addition, the maximum values ΔT of the temporal temperature change amounts calculated in a plurality of adjacent small regions are averaged (for example, arithmetic mean), and the value thus obtained may be used as the maximum value ΔT of the temporal temperature change amounts in these small regions. Accordingly, the influence of noise can be reduced.

In addition, the control unit 52 outputs the dross position information indicating the position of the dross to the communication unit 51. The communication unit 51 transmits the dross position information to the dross robot control device 60.

Figure 5:
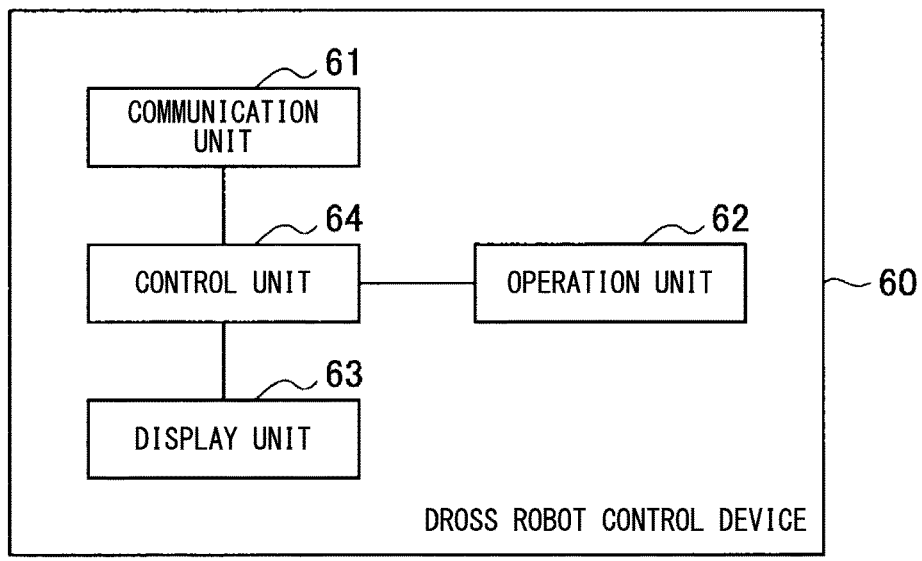
FIG. 5 is a functional block diagram showing an internal configuration of a dross robot control device.

The dross robot control device 60 causes the dross robot 30 to collect the bath surface dross at the specified position according to the dross position information. For example, as shown in FIG. 5, the dross robot control device 60 includes a communication unit 61, an operation unit 62, a display unit 63, and a control unit 64. The communication unit 61, the operation unit 62, the display unit 63, and the control unit 64 are realized by any of hardware configurations such as a CPU, a ROM, a RAM, a hard disk, a communication device, an operation device (for example, a keyboard and a mouse), and a display device. A program necessary for the operation of the dross robot control device 60 is recorded on the ROM, and the CPU reads and executes the program.

Figure 15:
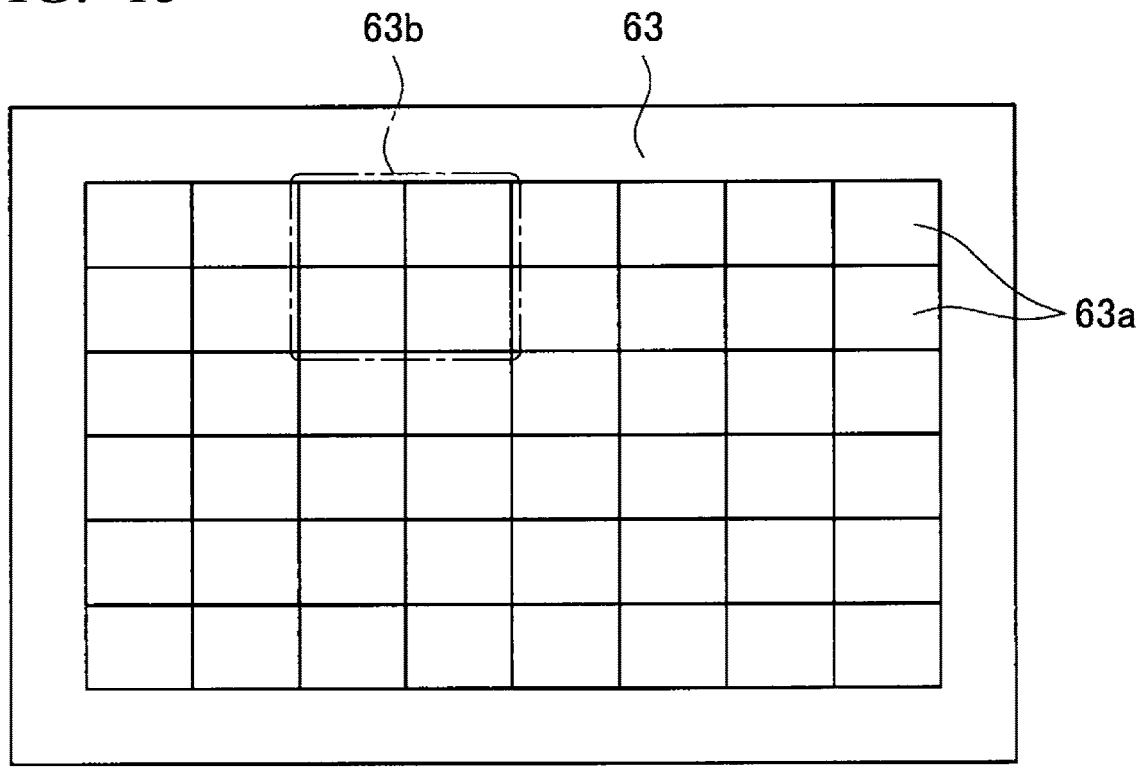
FIG. 15 is an explanatory diagram showing an example of small regions displayed on a display unit.

The communication unit 61 communicates with the dross sensor control device 50 and the dross robot 30. The operation unit 62 allows an input operation by an administrator of the coating apparatus 100, and outputs operation information according to the input operation to the control unit 64. The display unit 63 displays various kinds of information under the control of the control unit 64, for example, the temporal temperature change of each small region and dross position information. A display example is shown in FIG. 15. In FIG. 15, a plurality of small regions 63a are displayed on the display unit 63. The small regions 63a may be displayed in different display modes (for example, color) depending on the presence or absence of dross. In addition, a plurality of (in the shown example, four) small regions 63a adjacent to each other are treated as one display region 63b, and the average value of the temporal temperature change amounts corresponding to the small regions 63a included in the display region 63b may be displayed for each display region 63b. Accordingly, the operator can more accurately recognize the presence of the bath surface dross.

The control unit 64 controls each constituent element of the dross robot control device 60. In addition, the control unit 64 generates temperature request information and outputs the temperature request information to the communication unit 61. The communication unit 61 transmits the temperature request information to the communication unit 51 of the dross sensor control device 50. The communication unit 61 outputs the dross position information transmitted from the dross sensor control device 50 to the control unit 64. The control unit 64 specifies the position where the dross is collected, according to the dross position information. The control unit 64 causes the dross robot 30 to collect the dross at the specified position. For example, the control unit 64 outputs a control signal for collecting the dross at the position specified according to the dross position information, to the communication unit 61, and the communication unit 61 transmits the control signal to the dross robot 30. Here, the control unit 64 may cause the display unit 63 to display the small region corresponding to the position specified according to the dross position information as a region where dross is present.

Figure 7:
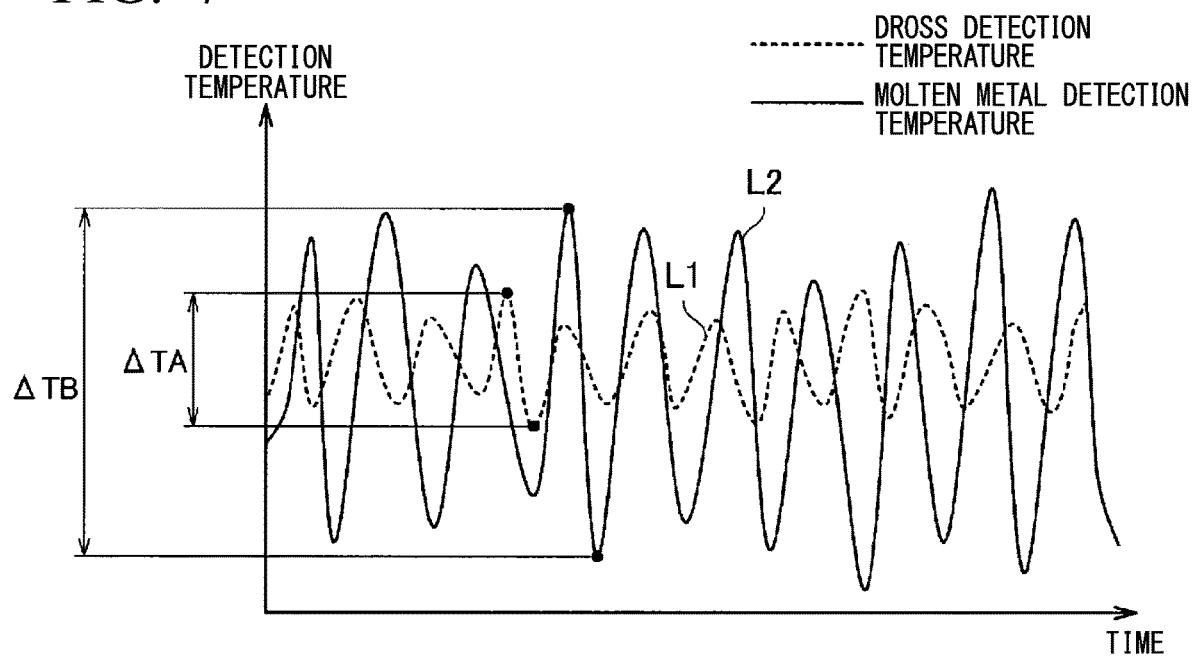
FIG. 7 is a graph showing a comparison between a temporal change in dross detection temperature and a temporal change in molten metal detection temperature.

Here, the reason why the presence or absence of dross can be determined by the control unit 52 will be described with reference to FIG. 7. FIG. 7 shows an example of a temporal temperature change in any of the small regions. A graph L1 shows a temporal temperature change (that is, a temporal change in the dross detection temperature) in a case where the bath surface dross is present in the small region, and a graph L2 shows a temporal temperature change (that is, a detected temporal change in the molten metal detection temperature) in a case where the bath surface dross is not present in the small region. A temporal variation in the dross detection temperature is smaller than a temporal variation in the molten metal detection temperature. Therefore, the maximum value ΔTA of the temporal change amount in the dross detection temperature in a certain sampling period is smaller than the maximum value ΔTB of the temporal change amount in the molten metal detection temperature. Therefore, it is possible to determine whether or not the bath surface dross is present in the small region according to the maximum value ΔT of the temporal temperature change amount.

Figure 8A:
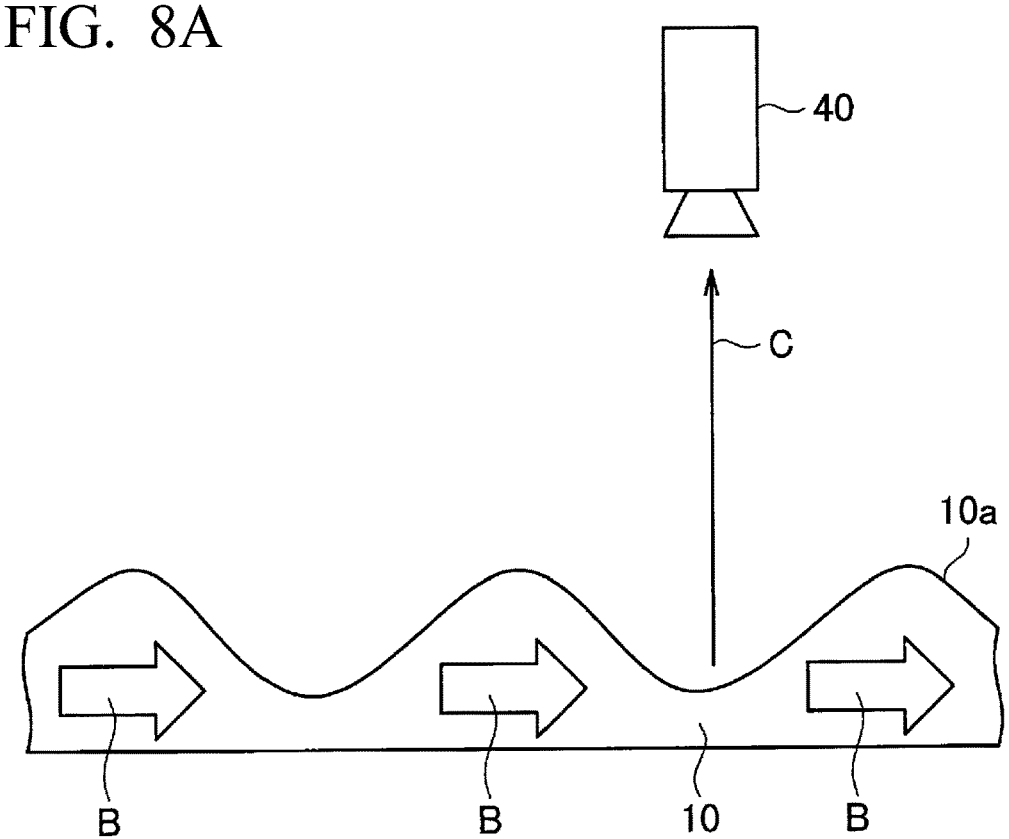
FIG. 8A is a side sectional view showing a form in which a bath surface temperature is detected.
Figure 8B:
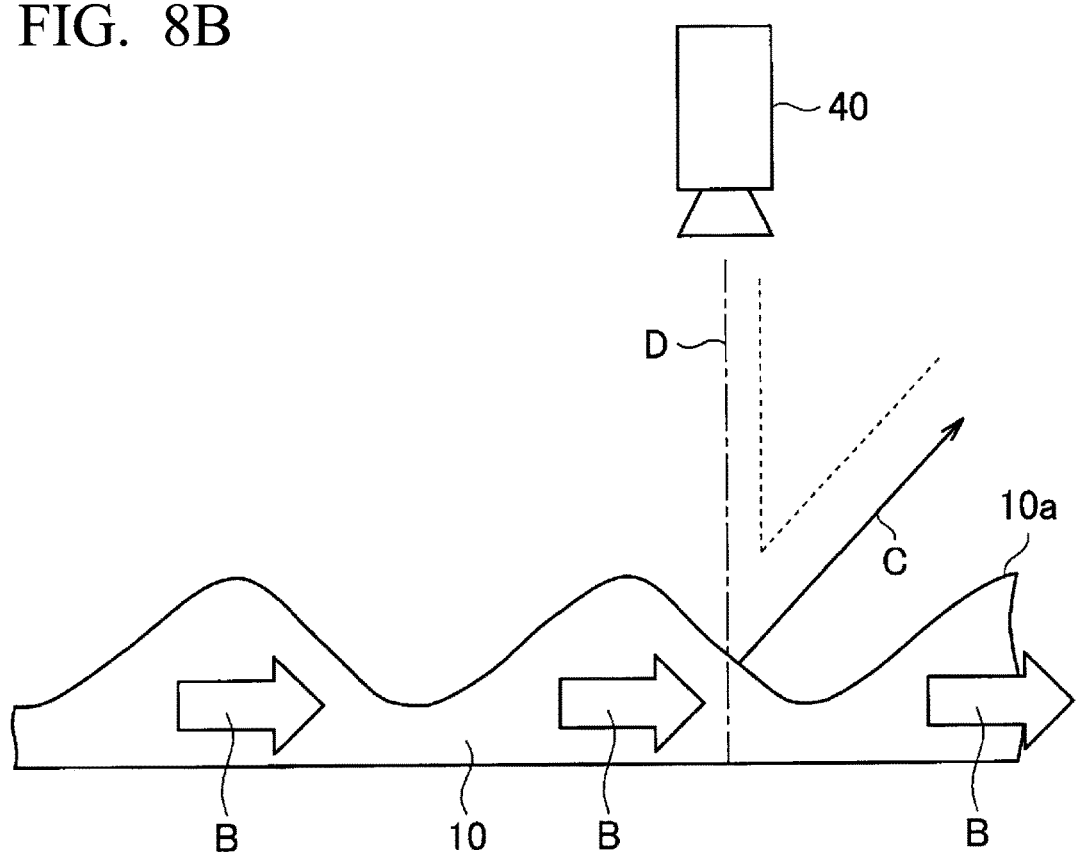
FIG. 8B is a side sectional view showing a form in which a bath surface temperature is detected.

It can be said that the reason for such a variation in temperature is the difference in bath surface state. That is, in the present embodiment, the bath surface dross 15 is detected according to the difference in the bath surface state. Hereinafter, the difference in bath surface state and the principle of detection of the bath surface dross will be described with reference to FIGS. 8A to 9B. FIGS. 8A to 9B show a form in which the dross sensor 40 detects infrared light C radiated from a small region. In FIG. 8A to 8B, no bath surface dross is present in the small region, and in FIGS. 9A to 9B, the bath surface dross 15 is present in the small region. In addition, the bath surface 10a is wavy, and the wave moves in the direction of arrow B. Since the metal strip 1 is continuously immersed in the coating bath 10, such a wave is generated. FIGS. 8A to 9B are merely conceptual diagrams.

In general, the intensity of infrared light radiated from the surface of an object to be measured changes according to the change in the temperature on the surface of the object. Therefore, in a general radiation-type thermometer (or infrared thermography camera), the temperature distribution on the surface of the object can be examined from the intensity of infrared light radiated from the surface of the object using such a principle. On the other hand, since the intensity of infrared light radiated from the surface of the object changes depending on the emissivity of the object itself, the intensity also changes depending on the kind (component and the like) of the object. However, it is considered that regarding at least the molten metal used in the coating bath, the intensity of infrared light does not change significantly even if the kind of molten metal changes. Furthermore, the emissivity tends to change specifically with respect to a change in the radiation angle (schematically, the angle formed by the surface of the object and a traveling direction of the infrared light radiated from the surface) of infrared light radiated from the surface of the object. For example, depending on the kind of the object, the intensity of infrared light shows a substantially constant value until an inclination angle from the direction perpendicular to the surface of the object reaches about 50°. However, there are cases where the intensity of infrared light shows a change such as a sharp decrease when the inclination angle exceeds 50°. That is, the intensity of infrared light radiated from the object tends to increase as the radiation angle approaches 90°. Therefore, the intensity of infrared light measured by the radiation-type thermometer changes greatly with changes in the angle of the surface of the object with respect to the optical axis of the radiation-type thermometer. As described above, the intensity of infrared light radiated from the surface of the object depends on the temperature of the object, the type of the object, and the radiation angle from the object.

In the present embodiment, the temperature and the kind of the molten metal (and the bath surface dross 15) that is the object hardly fluctuate greatly during the detection period of the infrared light. On the other hand, as described above, the surface of the molten metal (that is, the bath surface 10a of the coating bath 10) is wavy, and the angle formed by the bath surface 10a and the optical axis D of the dross sensor 40 constantly changes. That is, the radiation angle of the infrared light incident on the dross sensor 40 constantly changes, and the intensity of the infrared light detected thereby constantly changes. On the other hand, the waviness in the region where the bath surface dross 15 is present is suppressed. Therefore, the degree of waviness is different between the position at which the bath surface dross 15 is present and the position at which the bath surface dross 15 is not present on the bath surface 10a, and the temporal change amount (that is, temporal temperature change amount) in the detected intensity of infrared light is also different. In the present embodiment, the bath surface dross 15 is detected according to such a principle.

Hereinafter, an example will be described with reference to FIGS. 8A to 9B. In order to facilitate understanding, in this example, the dross sensor 40 is assumed to detect infrared light radiated from a small region present immediately below the dross sensor 40. In the state shown in FIG. 8A, the small region present immediately below the dross sensor 40 is substantially perpendicular to the optical axis D of the dross sensor 40 (see FIG. 8B). The dross sensor 40 detects the infrared light C radiated from the small region. Here, since the radiation angle of the infrared light C generated from the small region is substantially 90°, the intensity thereof is extremely high. After that, the bath surface state becomes the state shown in FIG. 8B. In this case, the traveling direction of the infrared light C radiated from the small region present immediately below the dross sensor 40 at a radiation angle of about 90° is largely inclined with respect to the optical axis D of the dross sensor 40 and is rarely incident on the dross sensor 40. In this case, infrared light at a radiation angle of smaller than 90° from the small region is incident on the dross sensor 40. The intensity of such infrared light is lower than the intensity of the infrared light C. As described above, since the bath surface 10A is wavy, the radiation angle of the infrared light detected by the dross sensor 40 is not stable. Therefore, in a case where no bath surface dross is present in the small region, the intensity of infrared light detected by the dross sensor 40 greatly varies. Therefore, the temperature detected by the dross sensor 40 also greatly varies.

Figure 9A:
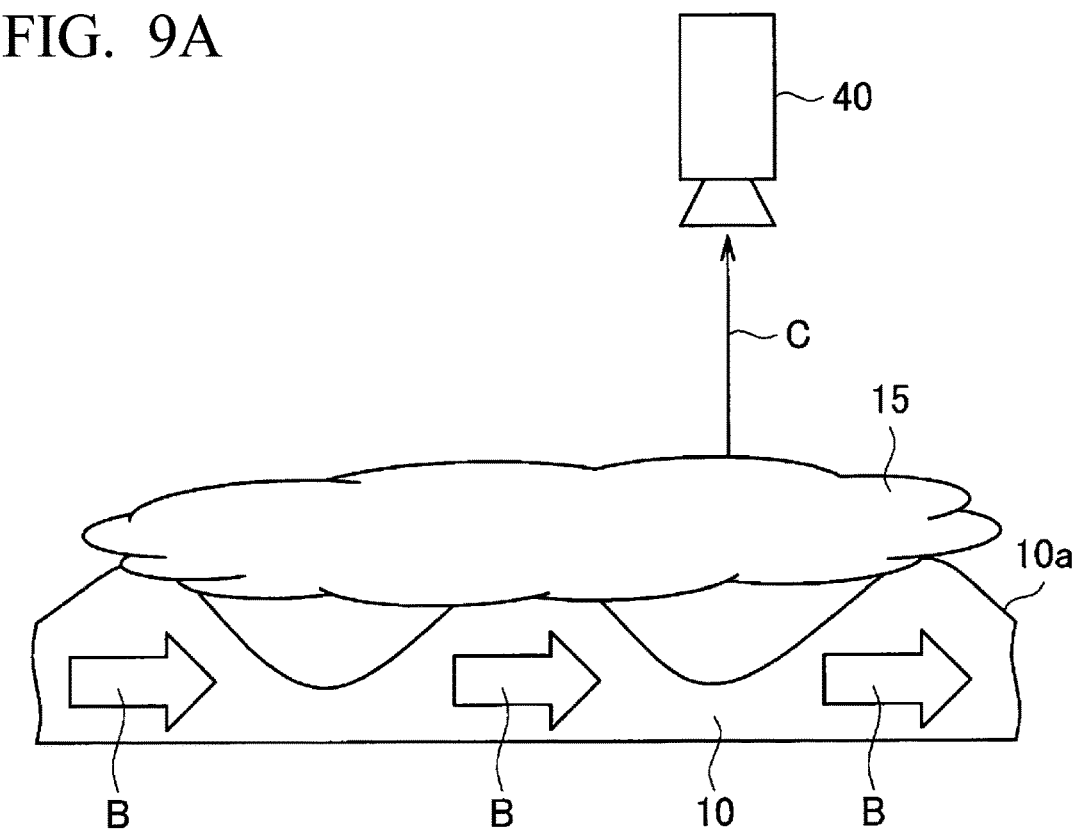
FIG. 9A is a side sectional view showing a form in which a dross temperature is detected.
Figure 9B:
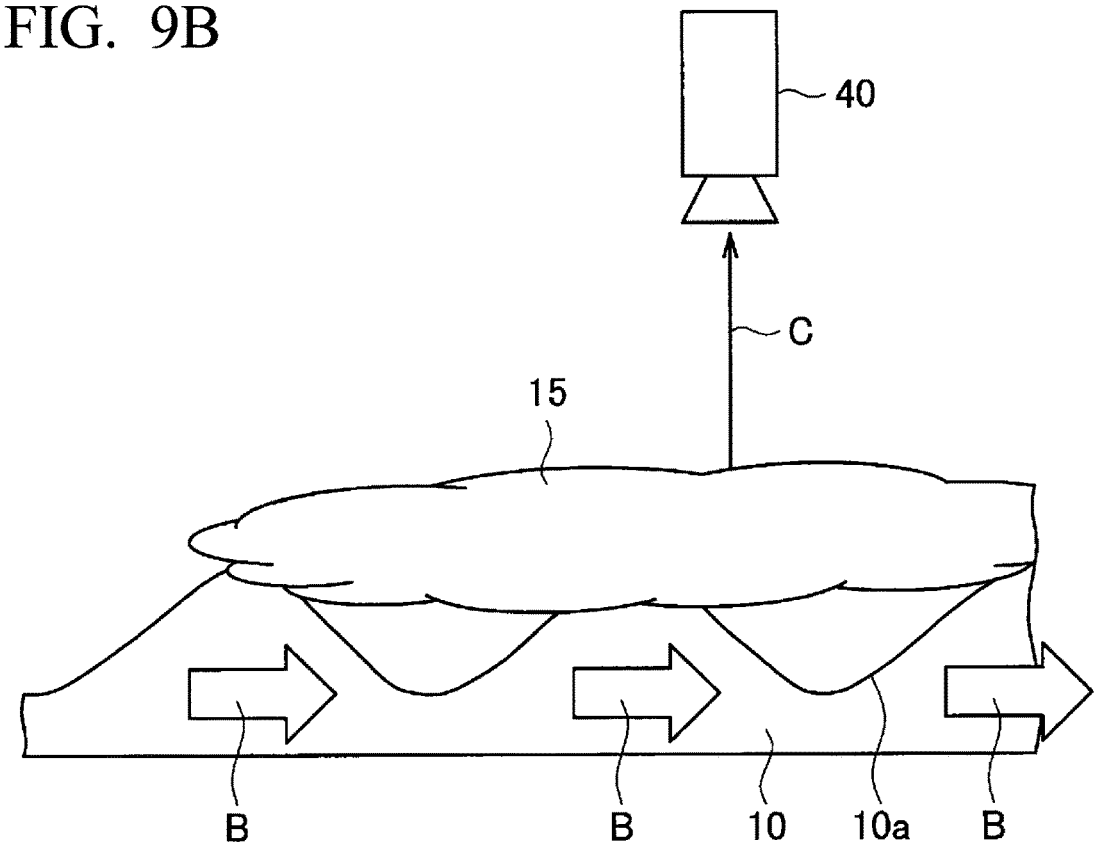
FIG. 9B is a side sectional view showing a form in which a dross temperature is detected.

On the other hand, in the state shown in FIG. 9A, the bath surface dross 15 is present within the small region. The surface of the bath surface dross 15 is relatively flat. That is, the small region is substantially perpendicular to the optical axis of the dross sensor 40. Therefore, the infrared light C radiated from the small region present immediately below the dross sensor 40, that is, at a radiation angle of about 90° from the bath surface dross 15 travels parallel to the optical axis D of the dross sensor 40 (see FIG. 8B) and is incident on the dross sensor 40. Thereafter, the bath surface state becomes the state shown in FIG. 9B. Also in FIG. 9B, the bath surface dross 15 is present within the small region. Therefore, the infrared light C radiated from the small region present immediately below the dross sensor 40, that is, at a radiation angle of about 90° from the bath surface dross 15 travels parallel to the optical axis D of the dross sensor 40 (see FIG. 8B) and is incident on the dross sensor 40. Therefore, in a case where the bath surface dross 15 is present in the small region, the intensity of the infrared light detected by the dross sensor 40 is relatively stable. Therefore, the temperature detected by the dross sensor 40 is also stable.

Therefore, a threshold value (predetermined value) for determining the presence or absence of bath surface dross is present in the maximum value $\Delta T$ of the temporal temperature change amount. When the present inventors verified the variation in temperature, it was found that in a case where the molten metal was molten zinc, the maximum value $\Delta TA$ of the temporal change amount in the dross detection temperature was approximately equal to or less than 5° C. Therefore, in a case where the molten metal is molten zinc, the threshold value is 5° C.

Therefore, when the maximum value $\Delta T$ of the temporal temperature change amount is equal to or less than 5° C., the control unit 52 determines that the bath surface dross is present in the small region. On the other hand, when the maximum value $\Delta T$ of the temporal temperature change amount is more than 5° C., the control unit 52 determines that no bath surface dross is present in the small region.

It is presumed that the threshold value does not fluctuate significantly depending on the kind of molten metal or metal strip 1, but the threshold value may be changed for each kind of coating apparatus 100. That is, the threshold value may be obtained by an experiment for each kind of coating apparatus 100. For example, the maximum value $\Delta TA$ of the temporal change amount in the dross detection temperature and the maximum value $\Delta TB$ of the temporal change amount in the molten metal detection temperature are measured by an experiment, and the threshold value may be calculated according to the experimental result. Furthermore, in the present embodiment, the presence or absence of bath surface dross is determined according to the maximum value of the temporal temperature change amount. However, the presence or absence of bath surface dross may be determined according to another value as long as the value is the amount that represents a change caused by the waviness of the bath surface 10a. For example, the presence or absence of bath surface dross may be determined according to a standard deviation value of the temperature within the sampling period, a fluctuation period, a deviation value from a central value, or the like. For example, regarding these parameters, a value in a case where bath surface dross is present and a value in a case where no bath surface dross is present may be measured, and the threshold value may be set according to these values.

The control unit 52 specifies the small region where the bath surface dross is present by performing the above-described processing on all the small regions. That is, the control unit 52 specifies the position where the bath surface dross is present. In addition, the control unit 52 generates dross position information regarding the position of the bath surface dross and outputs the dross position information to the communication unit 51. The communication unit 51 transmits the dross position information to the dross robot control device 60. The dross robot control device 60 receives the dross position information. The dross robot control device 60 specifies the position of the dross according to the dross position information, and transmits a control signal that causes the dross robot 30 to collect the dross at the specified position. The control unit 37 of the dross robot 30 drives the drive unit 36 according to the control signal to move the collecting portion 33 to the position of the bath surface dross and collect the bath surface dross.

1-3. Processing by Dross Removal Device

Figure 10:
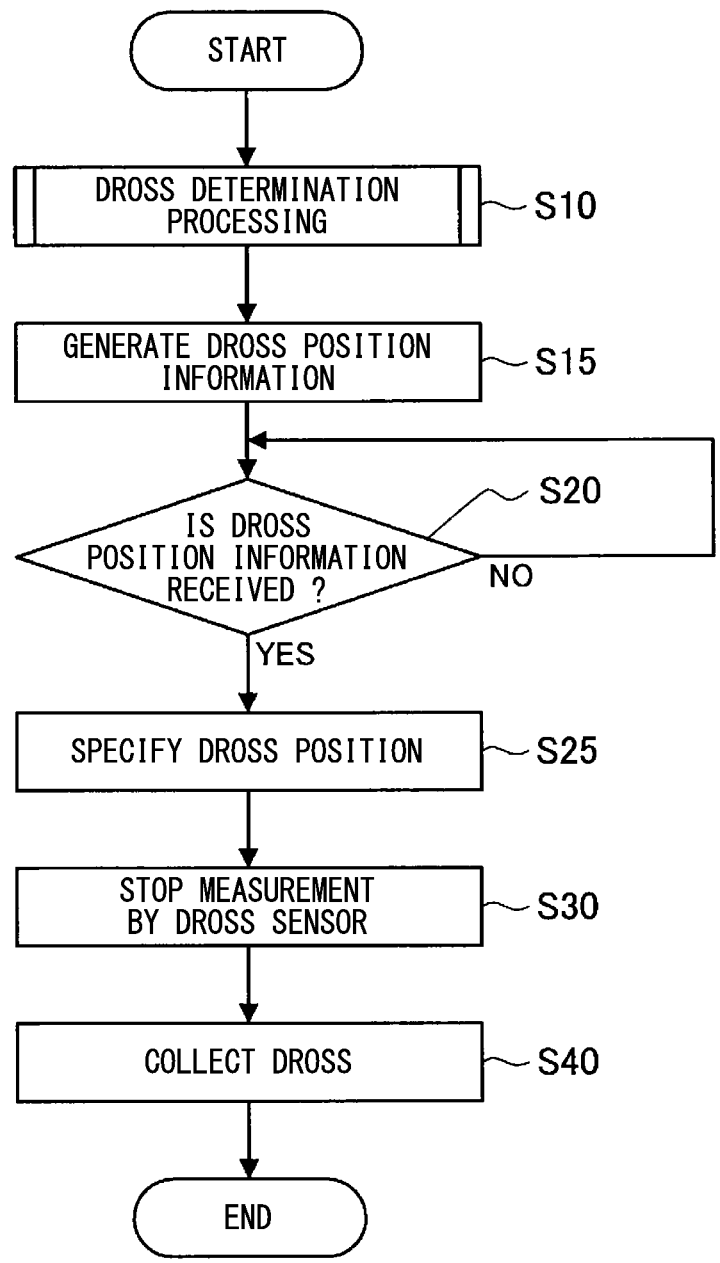
FIG. 10 is a flowchart showing a procedure of processing by the dross removal device.

Next, a procedure of processing by the dross removal device 20 will be described with reference to the flowcharts shown in FIGS. 10, 11, and 16. In addition, here, the procedure of the processing will be described by taking a case where the coating apparatus 100 produces a hot-dip galvanized steel sheet as an example. In this case, as a suitable example, the threshold value compared to the maximum value $\Delta T$ of the temporal temperature change is 5° C.

1-3-0. Outline of Processing

Figure 16:
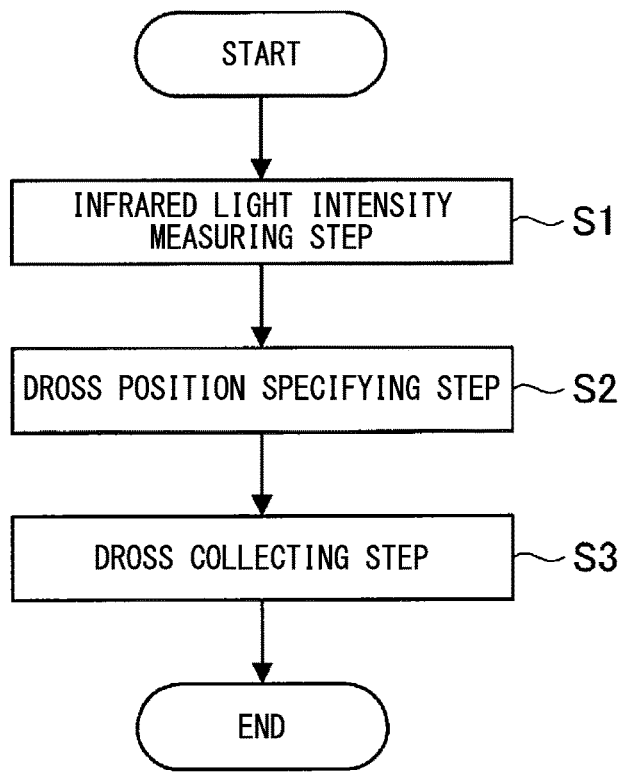
FIG. 16 is a flowchart showing an outline of a dross removal method.

FIG. 16 is a flowchart showing an outline of the processing by the dross removal device 20. In step S1, the dross removal device 20 measures the intensity of infrared light from the bath surface of the coating bath (infrared light intensity measuring step). In step S2, the dross removal device 20 specifies the position of the bath surface dross according to the temporal change amount in the intensity of infrared light (dross position specifying step). In step S3, the dross removal device 20 causes the dross robot to collect the bath surface dross at the position specified in the dross position specifying step (dross collecting step). Hereinafter, an example of detailed processing of the processing by the dross removal device 20 will be described.

1-3-1. Overall Processing

First, the overall processing will be described with reference to the flowchart shown in FIG. 10. In step S10, the dross removal device 20 performs dross determination processing shown in FIG. 11 for each small region of the detection range 10c. In this dross determination processing, the dross removal device 20 determines whether or not bath surface dross is present in the small region.

In step S15, the control unit 52 of the dross sensor control device 50 specifies the position of the bath surface dross according to the result of the dross determination processing (dross position specifying step). In addition, the control unit 52 generates dross position information regarding the position of the bath surface dross and outputs the dross position information to the communication unit 51. The communication unit 51 transmits the dross position information to the communication unit 61 of the dross robot control device 60. The communication unit 61 receives the dross position information and outputs the dross position information to the control unit 64.

In step S20, the control unit 64 waits until the dross position information is received from the dross sensor control device 50. In a case where the control unit 64 receives the dross position information (that is, in a case where the bath surface dross is present within the detection range 10c), the processing proceeds to step S25. In step S25, the control unit 64 specifies the position where bath surface dross is present within the detection range 10c according to the the dross position information. Since the bath surface dross is detected in steps S10 to S20, steps S10 to S20 constitute a dross detection method in the present embodiment.

In step S30, the control unit 64 stops the temperature measurement by the dross sensor 40. In step S40, the control unit 64 outputs a control signal according to the dross position information to the communication unit 61, and the communication unit 61 transmits the control signal to the communication unit 35 of the dross robot 30. The communication unit 35 outputs the control signal to the control unit 37. The control unit 37 specifies the position of the bath surface dross according to the control signal, and drives the drive unit 36 to move the collecting portion 33 to the position of the bath surface dross. The control unit 37 causes the collecting portion 33 to collect the bath surface dross (dross collecting step). Here, since the dross position specified in step S25 corresponds to the small region, the bath surface dross on the small region will be collected by the collecting portion 33. For example, in a case where the area of the small region is the same as the area that can be pumped up by the collecting portion 33 at one time, it is possible to efficiently collect the bath surface dross on the specified position of the dross.

1-3-2. Dross Determination Processing

Next, the procedure of the dross determination processing will be described with reference to the flowchart shown in FIG. 11. The dross determination processing is performed for each small region within the detection range 10c.

In step S50, the control unit 64 generates temperature request information and outputs the temperature request information to the communication unit 61. The communication unit 61 transmits the temperature request information to the communication unit 51 of the dross sensor control device 50. The communication unit 51 receives the temperature request information transmitted from the communication unit 61 of the dross robot control device 60 and outputs the temperature request information to the control unit 52. The control unit 52 generates temperature measurement instruction information according to the temperature request information and outputs the temperature measurement instruction information to the communication unit 51. The communication unit 51 transmits the temperature measurement instruction information to the dross sensor 40. When the temperature measurement instruction information is given, the dross sensor 40 measures the temperature of each small region and outputs the temperature distribution information to the communication unit 51. For example, the dross sensor 40 measures the temperature of each small region at every predetermined measurement interval (tf) and generates temperature distribution information. Then, the dross sensor 40 transmits the temperature distribution information to the dross sensor control device 50 (infrared light intensity measuring step).

The communication unit 51 of the dross sensor control device 50 outputs the temperature distribution information to the control unit 52. The control unit 52 specifies the maximum value TH and the minimum value TL of the temperature according to the temperature distribution information within the sampling period. The control unit 52 calculates the difference therebetween, that is, the maximum value $\Delta T$ of the temporal temperature change amount.

In step S60, the control unit 52 determines whether or not the maximum value $\Delta T$ of the temporal temperature change amount is equal to or less than 5° C. In a case where the control unit 52 determines that the maximum value $\Delta T$ of the temporal temperature change amount is equal to or less than 5° C., the processing proceeds to step S70. On the other hand, in a case where the maximum value $\Delta T$ of the temporal temperature change amount exceeds 5° C., the control unit 52 causes the processing to proceed to step S80. In order to improve the reliability of the determination, the control unit 52 may cause the processing to proceed to step S70 in a case where the maximum value $\Delta T$ of the temporal temperature change amount is equal to or less than 5° C. in a plurality of consecutive sampling periods. That is, consistency check may be performed. In this case, among these sampling periods, in a case where the maximum value $\Delta T$ of the temporal temperature change amount exceeds 5° C. in any of the sampling periods, the control unit 52 causes the processing to proceed to step S80.

In step S70, the control unit 52 determines that bath surface dross is present in the small region. Thereafter, the control unit 52 ends the dross determination processing. In step S80, the control unit 52 determines that no bath surface dross is present in the small region. Thereafter, the control unit 52 ends the dross determination processing.

As described above, according to the first embodiment, the dross removal device 20 specifies the position of the bath surface dross according to the temporal change amount in the intensity of the infrared light of the bath surface 10a, and causes the dross robot 30 to collect the bath surface dross at the specified position. Therefore, the bath surface dross can be collected more reliably, so that the bath surface dross can be efficiently collected. Accordingly, the quality of the coating layer can be made more stable.

In particular, the dross sensor divides the bath surface 10a into a plurality of small regions and measures the temperature of each small region. Then, the control unit 52 of the dross sensor control device 50 determines whether or not bath surface dross is present in the small region according to the temporal temperature change amount in each small region. Therefore, the bath surface dross can be collected more reliably, so that the bath surface dross can be efficiently collected.

Furthermore, the control unit 52 determines that the bath surface dross is present in the small region in a case where the temporal temperature change amount is equal to or less than a predetermined value (for example, 5° C.). Therefore, it is possible to more accurately determine whether or not the bath surface dross is present in each small region.

For example, the control unit 52 determines that the bath surface dross is present in the small region in a case where the maximum value ΔT of the temporal temperature change amount is equal to or less than the predetermined value. Therefore, it is possible to more accurately determine whether or not the bath surface dross is present in each small region.

Furthermore, since the dross sensor 40 is a radiation-type thermometer, the temperature distribution on the bath surface can be measured more accurately.

2. Second Embodiment

Next, a second embodiment will be described. In the first embodiment, the presence or absence of bath surface dross is determined for each small region. However, in a small region where no bath surface dross is present, the bath surface 10a is exposed to the air. In such a small region, a thin oxide film may be formed on the bath surface 10a. Such a thin oxide film is also called half dross. The half dross becomes oxide film dross as it grows, but half dross that remains as it is does not cause a problem as much as the bath surface dross. However, since the half dross eventually becomes oxide film dross, the half dross is preferably removed.

Therefore, in the second embodiment, the bath surface dross is removed in preference to the half dross (that is, before the half dross), and after the bath surface dross is not present within the detection range 10c, the half dross is removed. In addition, the maximum value ΔTC of the temporal change amount in half dross detection temperature (that is, the temperature of the small region where half dross is present) is more than the maximum value ΔTA of the temporal change amount in the dross detection temperature and smaller than the maximum value ΔTB of the temporal change amount in the molten metal detection temperature. Therefore, there is a threshold value for distinguishing the small region where half dross is present from other small regions. As an example, in a case where the molten metal is molten zinc, it has been found that the maximum value ΔTC of the temporal change amount in the half dross detection temperature is approximately more than 5° C. and equal to or less than 7° C. It is presumed that such a result is obtained because the bath surface 10a is slightly disturbed in the small region where the half dross is present. Therefore, the threshold value (predetermined value) for distinguishing the small region where half dross is present from other small regions is 7° C.

It is presumed that the threshold value does not fluctuate significantly depending on the kind of molten metal or metal strip 1, but the threshold value may be changed for each kind of coating apparatus 100. That is, the threshold value may be obtained by an experiment for each kind of coating apparatus 100. For example, the maximum value ΔTC of the temporal change amount in the half dross detection temperature may be measured by an experiment, and the threshold value may be calculated according to the experimental result.

2-1. Configuration of Coating Apparatus

The configuration of the coating apparatus 100 according to the second embodiment is similar to that of the first embodiment. Therefore, the description of the configuration is omitted.

2-2. Processing by Dross Removal Device

Figure 12:
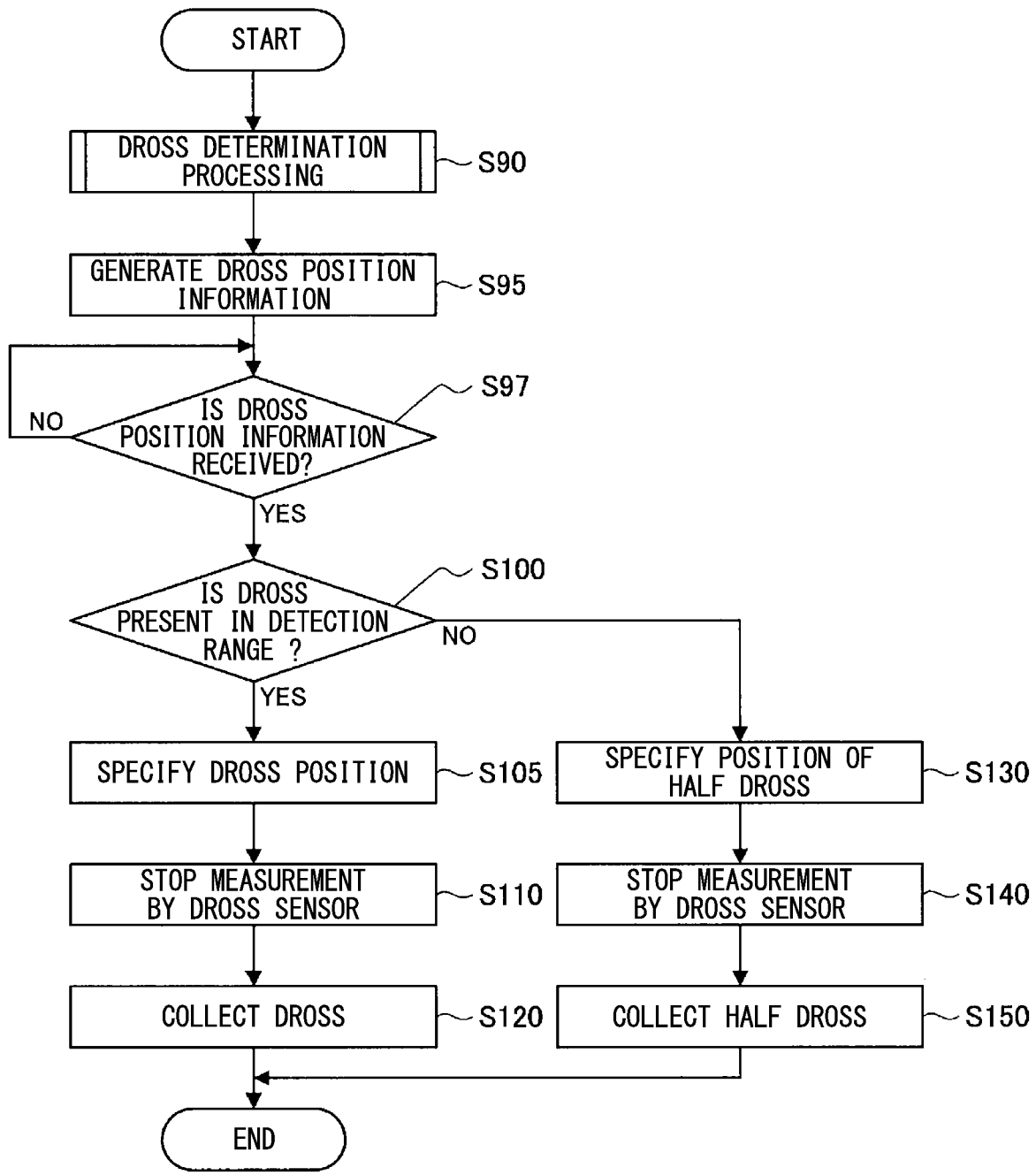
FIG. 12 is a flowchart showing a procedure of processing by the dross removal device according to a second embodiment.
Figure 13:
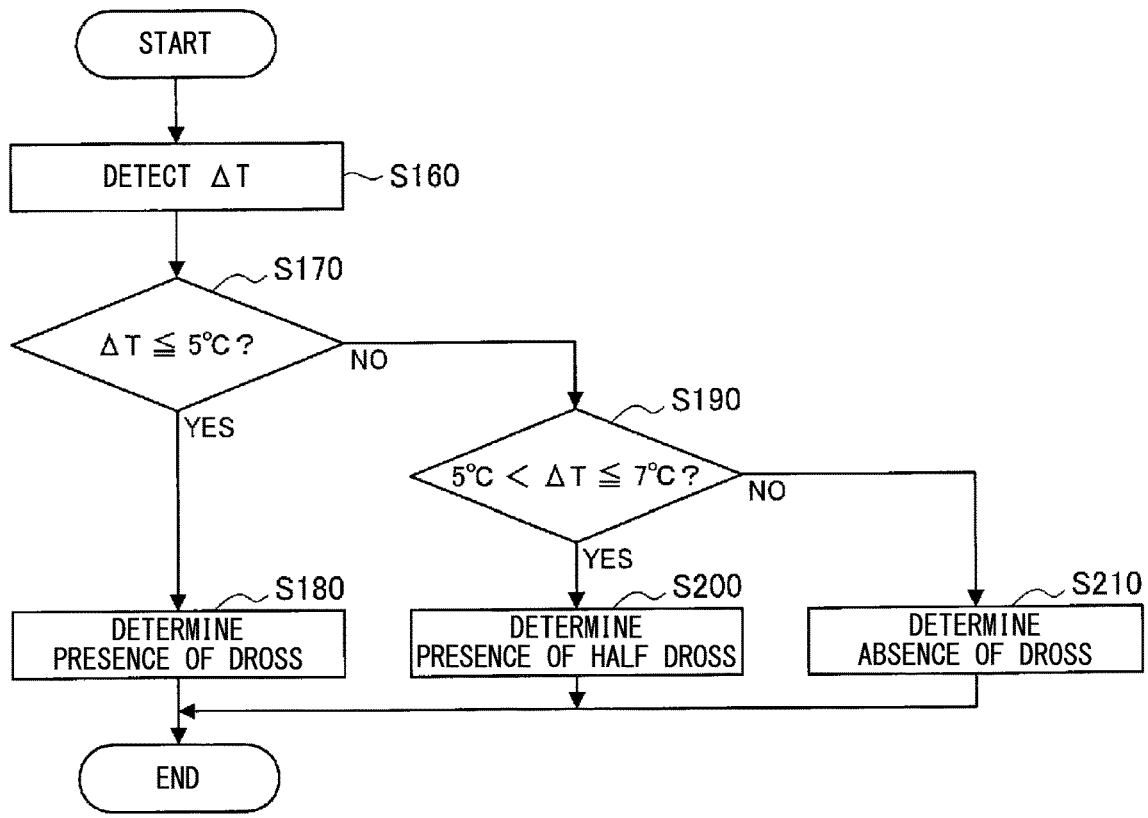
FIG. 13 is a flowchart showing a procedure of processing performed by the dross removal device according to the second embodiment.

Next, a procedure of processing by the dross removal device 20 will be described with reference to the flowcharts shown in FIGS. 12 and 13. In addition, here, the procedure of the processing will be described by taking a case where the coating apparatus 100 produces a hot-dip galvanized steel sheet as an example.

2-2-1. Overall Processing

First, the overall processing will be described with reference to the flowchart shown in FIG. 12. In step S90, the dross removal device 20 performs the dross determination processing shown in FIG. 13 for each small region of the detection range 10c. In the dross determination processing, the dross removal device 20 determines whether or not bath surface dross or half dross is present in the small region.

In step S95, the control unit 52 of the dross sensor control device 50 specifies the positions of the bath surface dross and the half dross according to the result of the dross determination processing. Then, the control unit 52 generates dross position information regarding the positions of the bath surface dross and the half dross, and transmits the dross position information to the communication unit 61 of the dross robot control device 60. The communication unit 61 outputs the dross position information to the control unit 64.

In step S97, the control unit 64 waits until the dross position information is received from the dross sensor control device 50. In a case where the control unit 64 receives the dross position information (that is, in a case where the bath surface dross or the half dross is present within the detection range 10c), the processing proceeds to step S100. In step S100, the control unit 64 recognizes whether or not the bath surface dross is present within the detection range 10c. In a case where the control unit 64 recognizes that the bath surface dross is present within the detection range 10c, the processing proceeds to step S105, and in a case where no bath surface dross is present within the detection range 10c (in this case, the dross within the detection range 10c is half dross), the processing proceeds to step S130.

In step S105, the control unit 64 specifies the position where the bath surface dross is present within the detection range 10c according to the dross position information. In steps S110 to S120, the control unit 64 performs the same processing as steps S30 to S40 shown in FIG. 10.

In step S130, the control unit 64 specifies the position where the half dross is present within the detection range 10c according to the dross position information. In step S140, the control unit 64 stops the temperature measurement by the dross sensor 40. In step S150, the control unit 64 outputs a control signal according to the dross position information to the communication unit 61, and the communication unit 61 transmits the control signal to the communication unit 35 of the dross robot 30. The communication unit 35 outputs the control signal to the control unit 37. The control unit 37 specifies the position of the half dross according to the control signal. The control unit 37 drives the drive unit 36 to move the collecting portion 33 to the position of the half dross. The control unit 37 causes the collecting portion 33 to collect the half dross (dross collecting step).

As described above, in the second embodiment, first, the bath surface dross is collected, and after the bath surface dross is not present within the detection range 10c, the half dross is collected.

2-2-2. Dross Determination Processing

Next, the procedure of the dross determination processing will be described with reference to the flowchart shown in FIG. 13. The dross determination processing is performed for each small region within the detection range 10c.

Figure 11:
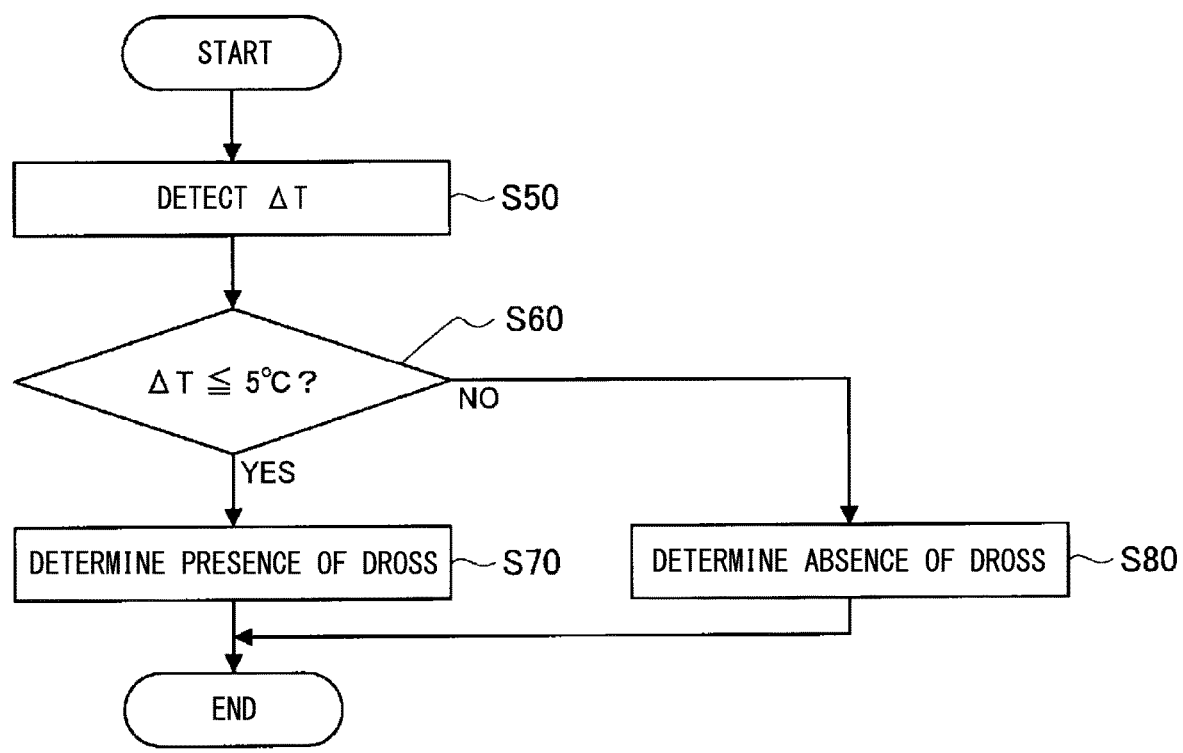
FIG. 11 is a flowchart showing a procedure of processing by the dross removal device.

In step S160, the dross removal device 20 performs the same processing as step S50 shown in FIG. 11. Accordingly, the control unit 52 calculates the maximum value ΔT of the temporal temperature change amount.

In step S170, the control unit 52 determines whether or not the maximum value ΔT of the temporal temperature change amount is equal to or less than 5° C. In a case where the control unit 52 determines that the maximum value ΔT of the temporal temperature change amount is equal to or less than 5° C., the processing proceeds to step S180. On the other hand, in a case where the maximum value ΔT of the temporal temperature change amount exceeds 5° C., the control unit 52 causes the processing to proceed to step S190. In order to improve the reliability of the determination, the control unit 52 may cause the processing to proceed to step S180 in a case where the maximum value ΔT of the temporal temperature change amount is equal to or less than 5° C. in a plurality of consecutive sampling periods. That is, consistency check may be performed. In this case, among these sampling periods, in a case where the maximum value ΔT of the temporal temperature change amount exceeds 5° C. in any of the sampling periods, the control unit 52 causes the processing to proceed to step S190.

In step S180, the control unit 52 determines that bath surface dross is present in the small region. Thereafter, the control unit 52 ends the dross determination processing.

In step S190, the control unit 52 determines whether or not the maximum value ΔT of the temporal temperature change amount is more than 5° C. and equal to or less than 7° C. In a case where the control unit 52 determines that the maximum value ΔT of the temporal temperature change amount is more than 5° C. and equal to or less than 7° C., the processing proceeds to step S200. On the other hand, in a case where the maximum value ΔT of the temporal temperature change amount exceeds 7° C., the control unit 52 causes the processing to proceed to step S210. In order to increase the reliability of the determination, the control unit 52 may cause the processing to proceed to step S200 in a case where the maximum value ΔT of the temporal temperature change amount is more than 5° C. and equal to or less than 7° C. in a plurality of consecutive sampling periods. That is, consistency check may be performed. In this case, among these sampling periods, in a case where the maximum value ΔT of the temporal temperature change amount exceeds 7° C. in any of the sampling periods, the control unit 52 causes the processing to proceed to step S210.

In step S200, the control unit 52 determines that half dross is present in the small region. Thereafter, the control unit 52 ends the dross determination processing. In step S210, the control unit 52 determines that the bath surface dross and the half dross are not present in the small region. Thereafter, the control unit 52 ends the dross determination processing.

As described above, according to the second embodiment, the control unit 52 of the dross sensor control device 50 determines that the bath surface dross is present in the small region in a case where the temporal temperature change amount is equal to or less than a first predetermined value (for example, 5° C.). On the other hand, the control unit 52 determines that the half dross is present in the small region in a case where the temporal temperature change amount is larger than the first predetermined value and equal to or less than a second predetermined value (for example, 7° C.). Then, the dross removal device 20 causes the dross robot to collect the bath surface dross before the half dross. Therefore, while preferentially collecting the bath surface dross that causes a defect in the coating layer, the half dross that may become the bath surface dross in the future can be collected in advance (that is, before the half dross becomes the bath surface dross). Accordingly, the quality of the coating layer can be made more stable.

In particular, the control unit 52 compares the maximum value ΔT of the temporal temperature change amount with each predetermined value. Therefore, it is possible to more accurately determine whether or not the bath surface dross or the half dross is present in each small region.

Furthermore, the dross removal device 20 causes the dross robot 30 to collect the half dross after there is no bath surface dross within the detection range 10c. Therefore, while preferentially collecting the bath surface dross that causes a defect in the coating layer, it is possible to collect in advance the half dross that may become the bath surface dross in the future.

EXAMPLES

Next, examples of the first and second embodiments will be described. The operating conditions in this example are as follows.

(1. Regarding Coating)
Kind of coating: Hot-dip galvanizing
Kind of metal: Steel sheet
Sheet threading size (thickness×width): 0.7×940 mm
Sheet threading speed: 160 mpm
Bath temperature of coating bath: 451° C.
Coating adhesion amount (adhesion amount after gas wiping): 48 g/m² per surface
(2. Regarding Dross Robot)
Dross robot: Yaskawa Electric MOTOMAN UP130
Shape of collecting portion: ladle type
Material of collecting portion: SUS304
Dimensions of collecting portion: Φ200×Φ80×85 (truncated cone)×length 1250 (mm)
Collection amount (for each collection): Maximum 20 kg
(3. Regarding Temperature Detection)
Kind of dross sensor: Radiation-type thermometer (FSV-210H manufactured by Apiste Corporation)
Measurement interval: 0.02 msec
Sampling interval: 15 sec
Consistency check frequency: 2 times Under the above operating conditions, the dross removal device 20 was allowed to perform the processing shown in FIGS. 12 and 13. As a result, each of the bath surface dross and the half dross present within the detection range of the dross sensor could be removed with a detection rate of 91%. That is, among the small regions determined to have bath surface dross by the dross removal device 20, 91% of the regions actually had bath surface dross. As described above, it could be confirmed that the dross removal device 20 according to the present embodiment could accurately determine the presence or absence of bath surface dross. Therefore, almost all of the bath surface dross could be removed by the dross removal device.

Although the preferred embodiments of the present invention have been described above in detail with reference to the accompanying drawings, the present invention is not limited to such examples. It is obvious that those having ordinary knowledge in the technical field to which the present invention belongs can come up with various alterations or modifications within the scope of the technical idea described in the claims, and it is understood that these naturally belong to the technical scope of the present invention.

BRIEF DESCRIPTION OF THE REFERENCE SYMBOLS

100 Coating apparatus
1 Metal strip
2 Snout
3 Pot roll
4 Pair of support rolls
5 Gas wiping device
10 Coating bath
10a Bath surface
15 Bath surface dross
20 Dross removal device
30 Dross robot
31 Main body portion
32 Arm portion
33 Collecting portion
40 Dross sensor
50 Dross sensor control device
51 Communication unit
52 Control unit
60 Dross robot control device
61 Communication unit
62 Operation unit
63 Display unit
64 Control unit

What is claimed is:

1. A dross removal method comprising:
an infrared light intensity measuring step of measuring an intensity of infrared light from a bath surface of a coating bath;
a dross position specifying step of specifying a position of a bath surface dross according to a temporal change amount in the intensity of the infrared light; and
a dross collecting step of causing a dross robot to collect the bath surface dross at the position specified by the dross position specifying step, wherein
a temperature of the bath surface of the coating bath is measured according to the intensity of the infrared light,
the position of the bath surface dross is specified according to a temporal temperature change amount in the bath surface of the coating bath,
the bath surface is divided into a plurality of small regions, and a temperature of each of the small regions is measured, and
whether or not the bath surface dross is present in each of the small regions is determined according to the temporal temperature change amount in each of the small regions.

2. A dross detection method comprising:
an infrared light intensity measuring step of measuring an intensity of infrared light from a bath surface of a coating bath; and
a dross position specifying step of specifying a position of a bath surface dross according to a temporal change amount in the intensity of the infrared light, wherein
a temperature of the bath surface of the coating bath is measured according to the intensity of the infrared light,
the position of the bath surface dross is specified according to a temporal temperature change amount in the bath surface of the coating bath,
the bath surface is divided into a plurality of small regions, and a temperature of each of the small regions is measured, and
whether or not the bath surface dross is present in each of the small regions is determined according to the temporal temperature change amount in each of the small regions.

3. A dross removal device comprising:
a dross robot that is configured to collect a bath surface dross present on a bath surface of a coating bath;
a dross sensor that is configured to measure an intensity of infrared light from the bath surface of the coating bath;
a dross sensor control device that is configured to specify a position of the bath surface dross according to a temporal change amount in the intensity of the infrared light; and
a dross robot control device that is configured to cause the dross robot to collect the bath surface dross at the position specified by the dross sensor control device,
wherein the dross sensor is configured to measure a temperature of the bath surface of the coating bath according to the intensity of the infrared light, and
the dross sensor control device specifies the position of the bath surface dross according to a temporal temperature change amount in the bath surface of the coating bath,
wherein the dross sensor is configured to divide the bath surface into a plurality of small regions, and measure a temperature of each of the small regions, and
the dross sensor control device is configured to determine whether or not the bath surface dross is present in each of the small regions according to the temporal temperature change amount in each of the small regions.

4. The dross removal device according to claim 3,
wherein the dross sensor control device is configured to determine that the bath surface dross is present in each of the small regions in a case where the temporal temperature change amount is equal to or less than a predetermined value.

5. The dross removal device according to claim 4,
wherein the dross sensor control device is configured to determine that the bath surface dross is present in each of the small regions in a case where a maximum value of the temporal temperature change amount is equal to or less than a predetermined value.

6. The dross removal device according to claim 4,
wherein the dross sensor control device is configured to determine that the bath surface dross is present in each of the small regions in a case where the temporal temperature change amount is equal to or less than a first predetermined value, and determine that a half dross is present in each of the small regions in a case where the temporal temperature change amount is larger than the first predetermined value and is equal to or less than a second predetermined value, and
the dross robot control device is configured to cause the dross robot to collect the bath surface dross in preference to the half dross.

7. The dross removal device according to claim 6,
wherein the dross robot control device is configured to cause the dross robot to collect the half dross after the dross sensor control device determines that the bath surface dross is not present within a detection range of the dross sensor.

8. The dross removal device according to claim 3, wherein the dross sensor is a radiation-type thermometer, is configured to detect the intensity of the infrared light from the bath surface, and measure a temperature of the bath surface according to the intensity of the infrared light.

9. A dross detection device comprising:

a dross sensor that is configured to measure an intensity of infrared light from at bath surface of a coating bath; and a dross sensor control device that is configured to specify a position of a bath surface dross according to a temporal change amount in the intensity of the infrared light, wherein a temperature of the bath surface of the coating bath is measured according to the intensity of the infrared light, the position of the bath surface dross is specified according to a temporal temperature change amount in the bath surface of the coating bath, the bath surface is divided into a plurality of small regions, and a temperature of each of the small legions is measured, and whether or not the bath surface dross is present in each of the small regions is determined according to the temporal temperature change amount in each of the small regions.

* * * * *